(12) United States Patent
Chen et al.

(10) Patent No.: US 8,575,865 B2
(45) Date of Patent: Nov. 5, 2013

(54) TEMPERATURE BASED WHITE POINT CONTROL IN BACKLIGHTS

(75) Inventors: Cheng Chen, Cupertino, CA (US); Jun Qi, Cupertino, CA (US); John Z. Zhong, Cupertino, CA (US); Victor H. Yin, Cupertino, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 860 days.

(21) Appl. No.: 12/410,164

(22) Filed: Mar. 24, 2009

(65) Prior Publication Data
US 2010/0244701 A1    Sep. 30, 2010

(51) Int. Cl.
H05B 37/02    (2006.01)

(52) U.S. Cl.
USPC ............................ 315/308; 315/307; 315/309

(58) Field of Classification Search
USPC ............ 315/32, 50, 112, 117–118, 307–309; 345/101
See application file for complete search history.

(56) References Cited

U.S. PATENT DOCUMENTS

| | | | |
|---|---|---|---|
| 6,285,344 B1 | 9/2001 | Everard et al. | |
| 6,608,614 B1 | 8/2003 | Johnson | |
| 6,630,801 B2 | 10/2003 | Schuurmans | |
| 6,636,003 B2 | 10/2003 | Rahm et al. | |
| 6,693,394 B1 | 2/2004 | Guo et al. | |
| 6,933,967 B2 | 8/2005 | Doyle et al. | |
| 7,119,500 B2 | 10/2006 | Young | |
| 7,969,097 B2 * | 6/2011 | Van De Ven | 315/112 |
| 7,982,706 B2 * | 7/2011 | Ichikawa et al. | 345/102 |
| 8,018,427 B2 * | 9/2011 | Hamada | 345/102 |
| 2003/0193629 A1 | 10/2003 | Yamaguchi | |
| 2004/0239243 A1 * | 12/2004 | Roberts et al. | 313/512 |
| 2005/0263674 A1 | 12/2005 | Lee et al. | |
| 2005/0286264 A1 * | 12/2005 | Kim et al. | 362/600 |
| 2006/0022616 A1 * | 2/2006 | Furukawa et al. | 315/309 |
| 2007/0120496 A1 * | 5/2007 | Shimizu et al. | 315/169.3 |
| 2007/0141732 A1 | 6/2007 | Huang et al. | |
| 2007/0274093 A1 | 11/2007 | Haim et al. | |
| 2008/0062139 A1 | 3/2008 | Hotelling et al. | |
| 2008/0062140 A1 | 3/2008 | Hotelling et al. | |
| 2008/0088647 A1 | 4/2008 | Marcu et al. | |
| 2008/0121898 A1 | 5/2008 | Yin et al. | |
| 2008/0136770 A1 * | 6/2008 | Peker et al. | 345/102 |
| 2008/0151527 A1 | 6/2008 | Ueno et al. | |
| 2008/0204431 A1 | 8/2008 | Chung et al. | |

(Continued)

FOREIGN PATENT DOCUMENTS

JP    2001-209049 A    8/2001
WO    2007/125623 A1    11/2007

*Primary Examiner* — Jimmy Vu
*Assistant Examiner* — Henry Luong
(74) *Attorney, Agent, or Firm* — Fletcher Yoder PC

(57) ABSTRACT

Systems, methods, and devices are provided for maintaining a target white point on a light emitting diode based backlight. In one embodiment, the backlight may include two or more strings of light emitting diodes, each driven at a respective driving strength. Each string may include light emitting diodes from a different color bin, and the respective driving strengths may be adjusted, for example, through pulse width modulation or amplitude modulation, to maintain the target white point. In certain embodiments, the driving strengths may be adjusted to compensate for shifts in the white point that may occur due to temperature or aging. A controller may adjust the driving strengths based on feedback from a temperature sensor, from an optical sensor, from a user input, or from calibration data included within the backlight or system.

23 Claims, 20 Drawing Sheets

(56) References Cited

U.S. PATENT DOCUMENTS

| | | |
|---|---|---|
| 2008/0309627 A1 | 12/2008 | Hotelling et al. |
| 2008/0309633 A1 | 12/2008 | Hotelling et al. |
| 2008/0316222 A1 | 12/2008 | Marcu et al. |
| 2009/0002311 A1 | 1/2009 | Barnhoefer et al. |
| 2009/0002401 A1 | 1/2009 | Barnhoefer et al. |
| 2009/0002402 A1 | 1/2009 | Barnhoefer et al. |
| 2009/0002403 A1 | 1/2009 | Barnhoefer et al. |
| 2009/0002404 A1 | 1/2009 | Barnhoefer et al. |
| 2009/0002555 A1 | 1/2009 | Barnhoefer et al. |
| 2009/0002560 A1 | 1/2009 | Barnhoefer et al. |
| 2009/0002561 A1 | 1/2009 | Barnhoefer et al. |
| 2009/0002563 A1 | 1/2009 | Barnhoefer et al. |
| 2009/0002564 A1 | 1/2009 | Barnhoefer et al. |
| 2009/0002565 A1 | 1/2009 | Barnhoefer et al. |
| 2009/0002785 A1 | 1/2009 | Marcu et al. |
| 2009/0009442 A1 | 1/2009 | Galbraith, Jr. et al. |
| 2009/0128578 A1 | 5/2009 | Feng |
| 2010/0128064 A1* | 5/2010 | Taylor et al. ............... 345/690 |
| 2010/0245227 A1* | 9/2010 | Chen et al. ................ 345/102 |
| 2010/0277410 A1* | 11/2010 | You et al. .................. 345/102 |
| 2010/0320928 A1 | 12/2010 | Kaihotsu et al. |

* cited by examiner

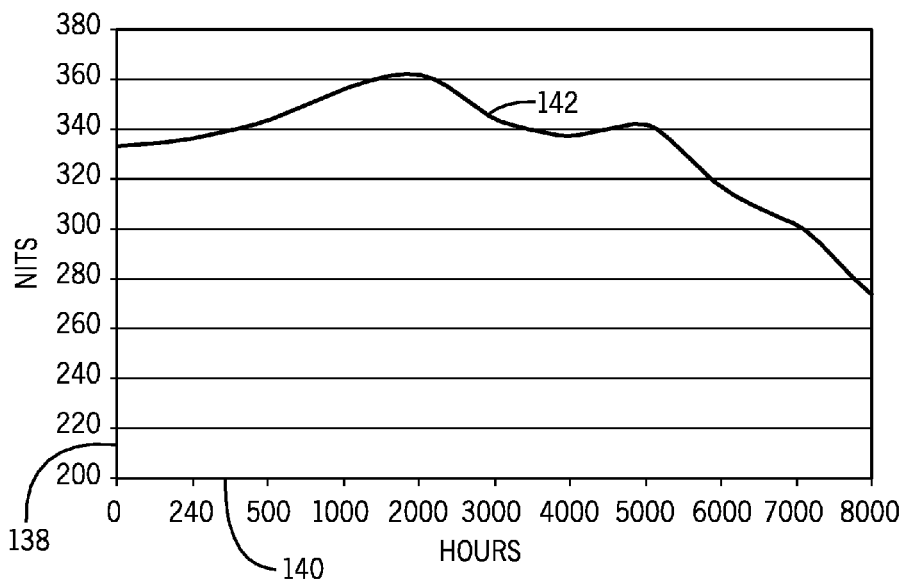
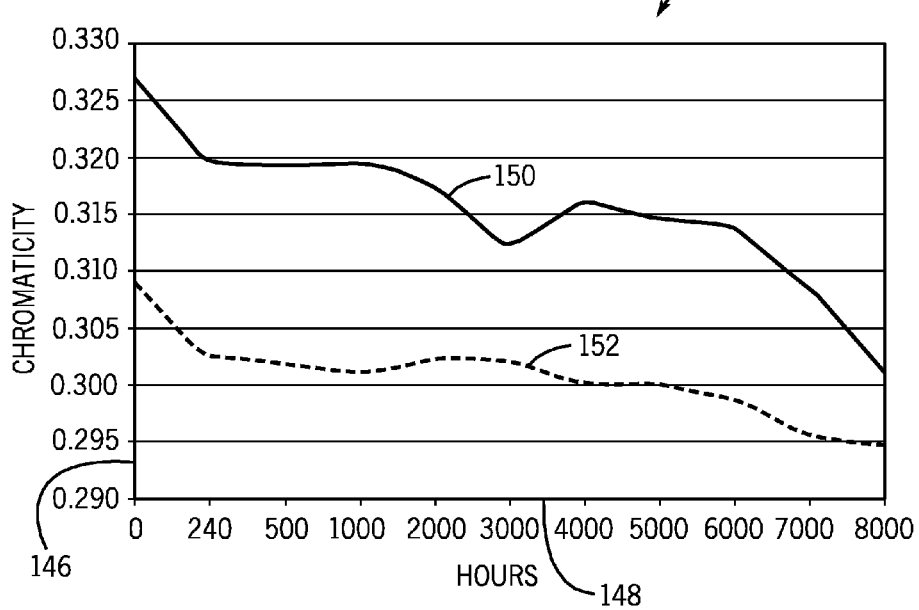

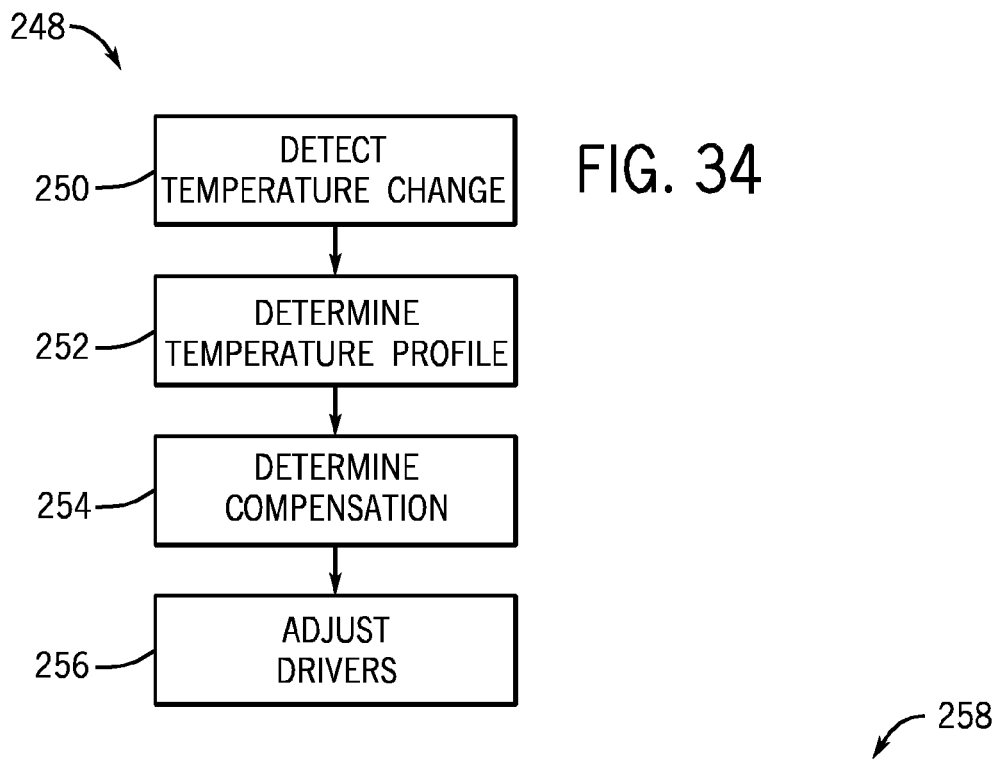
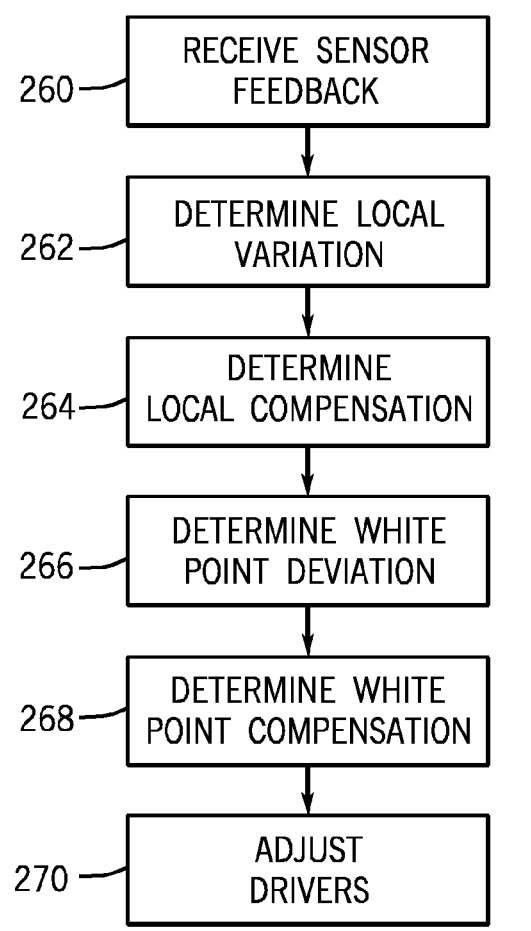

TEMPERATURE BASED WHITE POINT CONTROL IN BACKLIGHTS

BACKGROUND

The present disclosure relates generally to backlights for displays, and more particularly to light emitting diode based backlights.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including portable and desktop computers, televisions, and handheld devices, such as cellular telephones, personal data assistants, and media players. Traditionally, LCDs have employed cold cathode fluorescent light (CCFL) light sources as backlights. However, advances in light emitting diode (LED) technology, such as improvements in brightness, energy efficiency, color range, life expectancy, durability, robustness, and continual reductions in cost, have made LED backlights a popular choice for replacing CCFL light sources. However, while a single CCFL can light an entire display; multiple LEDs are typically used to light comparable displays.

Numerous white LEDs may be employed within a backlight. Depending on manufacturing precision, the light produced by the individual white LEDs may have a broad color or chromaticity distribution, for example, ranging from a blue tint to a yellow tint or from a green tint to a purple tint. During manufacturing, the LEDs may be classified into bins with each bin representing a small range of chromaticity values emitted by the LEDs. To reduce color variation within a backlight, LEDs from similar bins may be mounted within a backlight. The selected bins may encompass the desired color, or target white point, of the backlight.

High quality displays may desire high color uniformity throughout the display, with only small deviations from the target white point. However, it may be costly to utilize LEDs from only one bin or from a small range of bins. Further, the white point of the LEDs may change over time and/or with temperature, resulting in deviations from the target white point.

SUMMARY

A summary of certain embodiments disclosed herein are set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for controlling the white point in LED backlights. In accordance with one disclosed embodiment, an LED backlight includes LEDs from multiple color bins. When the light output from the LEDs is mixed, the desired white point may be achieved. The LEDs from each bin may be grouped into one or more strings each driven by a separate driver or driver channel. Accordingly, the driving strength for the LEDs from different color bins may be independently adjusted to fine tune the white point to the target white point. Further, the driving strength of the LEDs may be adjusted to compensate for the shifts in the white point that may occur due to aging of the LEDs, aging of the backlight components, or temperature variations, such as localized temperature gradients within the backlight or variations in ambient temperature, among others.

BRIEF DESCRIPTION OF THE DRAWINGS

Various aspects of this disclosure may be better understood upon reading the following detailed description and upon reference to the drawings in which:

FIG. 18 is a chart depicting the effects of aging on LED brightness, in accordance with aspects of the present disclosure;

FIG. 19 is a chart depicting the effects of aging on a white point, in accordance with aspects of the present disclosure;

FIG. 19 is a chart depicting the effects of aging on a white point, in accordance with aspects of the present disclosure;

FIG. 34 is a flowchart depicting a method for operating an LED backlight with sensors during variations in temperature, in accordance with aspects of the present disclosure; and FIG. 35 is a flowchart depicting a method for operating an LED backlight with sensors to compensate for aging effects and temperature variations, in accordance with aspects of the present disclosure.

DETAILED DESCRIPTION OF SPECIFIC EMBODIMENTS

1. Introduction

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques for dynamically controlling the white point of LED backlights. The backlights may include LEDs from multiple bins having various chromaticity values and/or brightness values. LEDs from each bin may be grouped together into one or more strings, controlled independently by separate drivers or driver channels. The independent control allows each string of LEDs to be operated at a separate driving strength to fine-tune the white point of the LED backlight. The driving strength may be adjusted by manufacturing settings, user input, and/or feedback from sensors. In certain embodiments, calibration curves may be employed to adjust the driving strength to compensate for aging and/or temperature effects. In other embodiments, sensors detecting color, brightness, and/or temperature may be employed to adjust the driving strength of the drivers or channels to maintain the desired white point.

Figure 1:
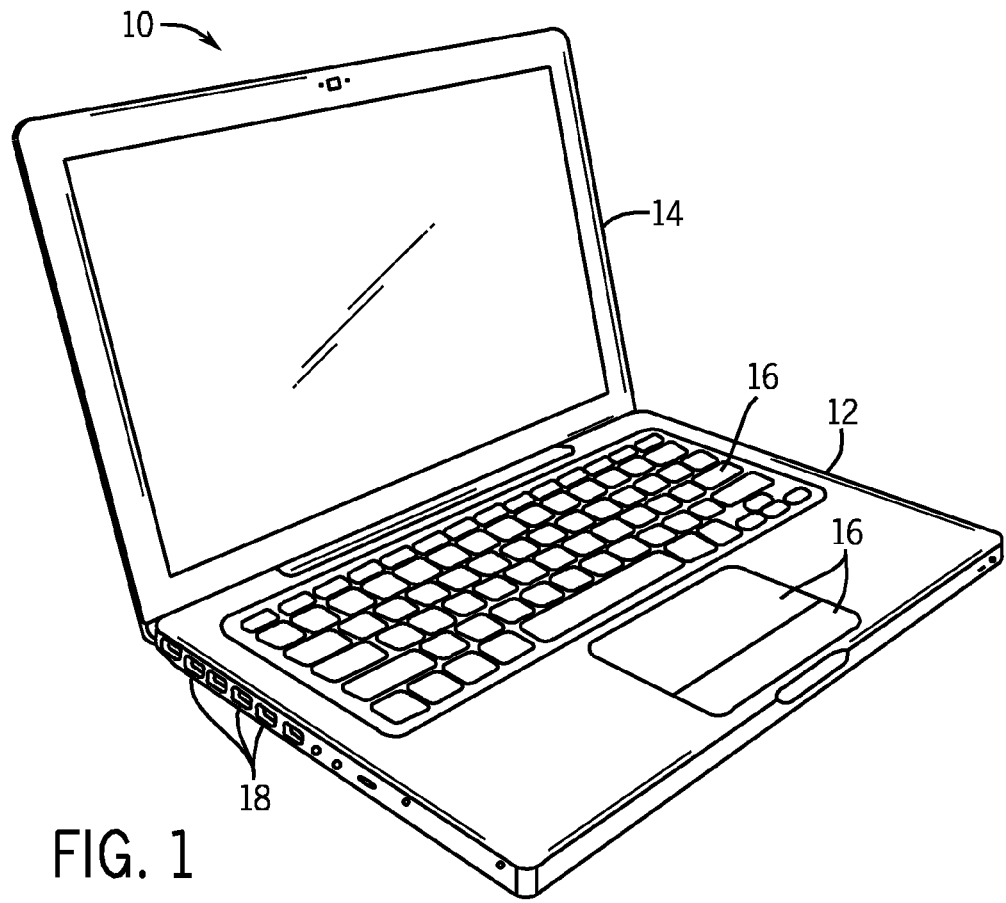
FIG. 1 is a front view of an example of an electronic device employing an LCD display with an LED backlight, in accordance with aspects of the present disclosure.

FIG. 1 illustrates electronic device 10 that may make use of the white point control techniques for an LED backlight as described above. It should be noted that while the techniques will be described below in reference to illustrated electronic device 10 (which may be a laptop computer), the techniques described herein are usable with any electronic device employing an LED backlight. For example, other electronic devices may include a desktop computer, a viewable media player, a cellular phone, a personal data organizer, a workstation, or the like. In certain embodiments, the electronic device may include a model of a MacBook®, a MacBook® Pro, MacBook Air®, iMac®, Mac® mini, or Mac Pro® available from Apple Inc. of Cupertino, Calif. In other embodiments, the electronic device may include other models and/or types of electronic devices employing LED backlights, available from any manufacturer.

As illustrated in FIG. 1, electronic device 10 includes housing 12 that supports and protects interior components, such as processors, circuitry, and controllers, among others, that may be used to generate images to display on display 14. Housing 12 also allows access to user input structures 16, such as a keypad, track pad, and buttons, that may be used to interact with electronic device 10. For example, user input structures 16 may be manipulated by a user to operate a graphical user interface (GUI) and/or applications running on electronic device 10. In certain embodiments, input structures 16 may be manipulated by a user to control properties of display 14, such as the brightness the brightness and/or color of the white point. The electronic device 10 also may include various input and output (I/O) ports 18 that allow connection of device 10 to external devices, such as a power source, printer, network, or other electronic device. In certain embodiments, an I/O port 18 may be used to receive calibration information for adjusting the brightness and/or color of the white point.

Figure 2:
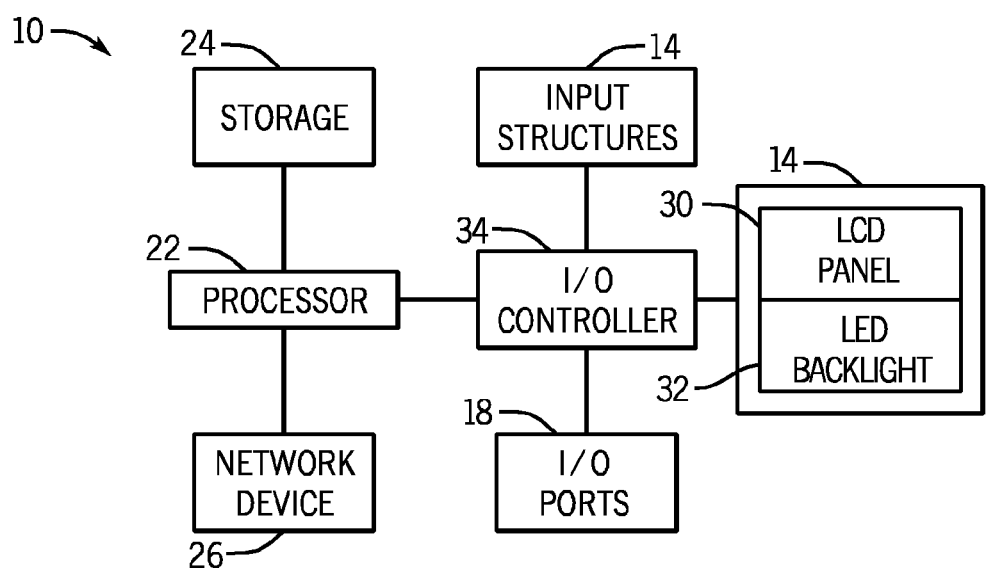
FIG. 2 is a block diagram of an example of components of the electronic device of FIG. 1, in accordance with aspects of the present disclosure.

FIG. 2 is a block diagram illustrating various components and features of device 10. In addition to display 14, input structures 16, and I/O ports 18 discussed above, device 10 includes a processor 22 that may control operation of device 10. Processor 22 may use data from storage 24 to execute the operating system, programs, GUI, and any other functions of device 10. In certain embodiments, storage 24 may store a program enabling a user to adjust properties, such as the white point color or brightness, of display 14. Storage 24 may include a volatile memory, such as RAM, and/or a non-volatile memory, ROM. Processor 22 also may receive data through I/O ports 18 or through network device 26, which may represent, for example, one or more network interface cards (NIC) or a network controller.

Information received through network device 26 and I/O ports 18, as well as information contained in storage 24, may be displayed on display 14. Display 14 may generally include LED backlight 32 that functions as a light source for LCD panel 30 within display 14. As noted above, a user may select information to display by manipulating a GUI through user input structures 16. In certain embodiments, a user may adjust properties of LED backlight 32, such as the color and/or brightness of the white point, by manipulating a GUI through user input structures 16. Input/output (I/O) controller 34 may provide the infrastructure for exchanging data between input structures 16, I/O ports 18, display 14, and processor 22.

Figure 3:
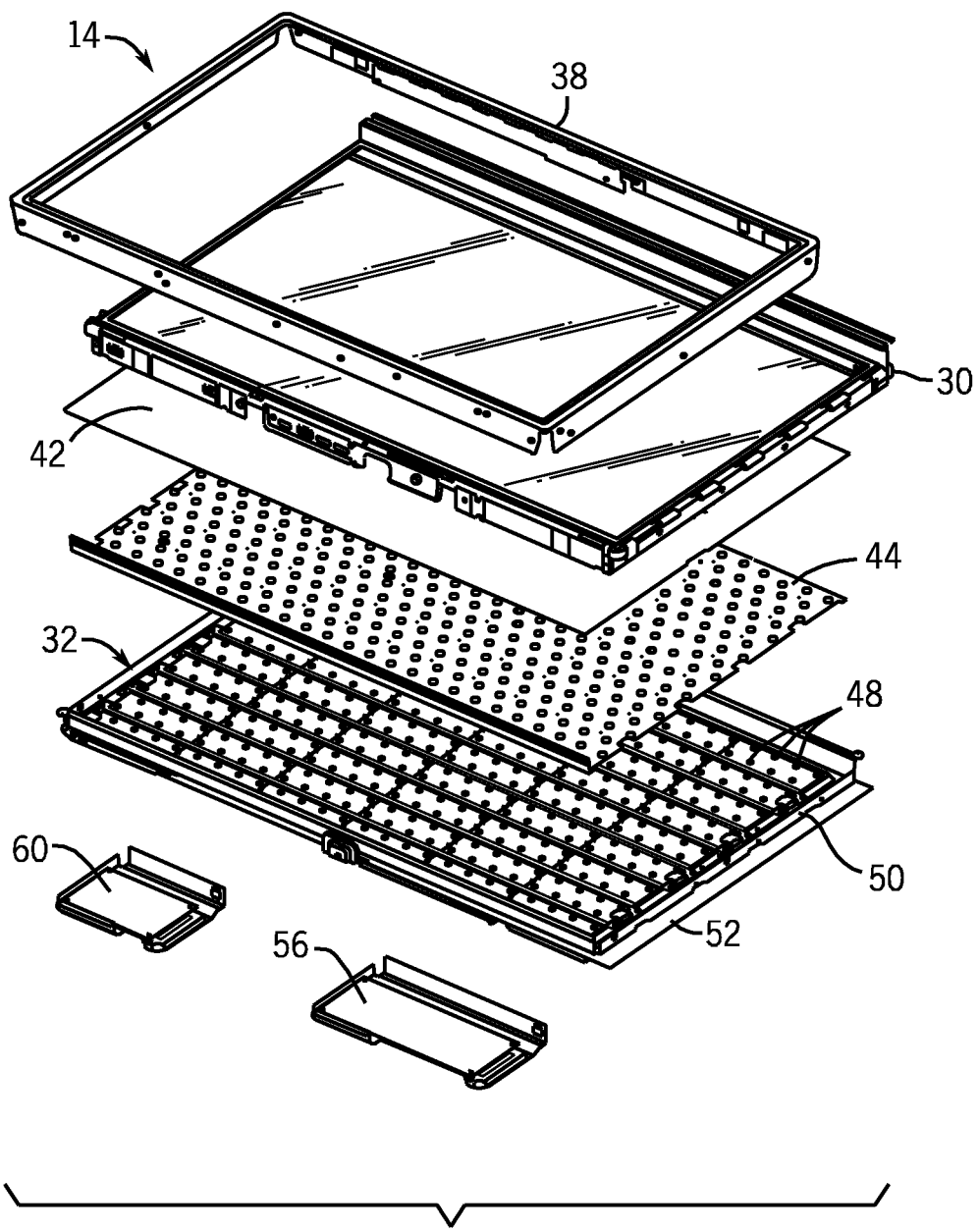
FIG. 3 is an exploded view of the LCD display of FIG. 2, in accordance with aspects of the present disclosure.

FIG. 3 is an exploded view of an embodiment of display 14 employing a direct-light backlight 32. Display 14 includes LCD panel 30 held by frame 38. Backlight diffuser sheets 42 may be located behind LCD panel 30 to condense the light passing to LCD panel 30 from LEDs 48 within LED backlight 32. LEDs 48 may include an array of white LEDs mounted on array tray 50. For example, in certain embodiments, LEDs 48 may be mounted on a Metal Core Printed Circuit Board (MCPCB), or other suitable type of support.

The LEDs 48 may be any type of LEDs designed to emit a white light. In certain embodiments, LEDs 48 may include phosphor based white LEDs, such as single color LEDs coated with a phosphor material, or other wavelength conversion material, to convert monochromatic light to broad-spectrum white light. For example, a blue die may be coated with a yellow phosphor material. In another example, a blue die may be coated with both a red phosphor material and a green phosphor material. The monochromatic light, for example, from the blue die, may excite the phosphor material to produce a complementary colored light that yields a white light upon mixing with the monochromatic light. LEDs 48 also may include multicolored dies packaged together in a single LED device to generate white light. For example, a red die, a green die, and a blue die may be packaged together, and the light outputs may be mixed to produce a white light.

One or more LCD controllers 56 and LED drivers 60 may be mounted beneath backlight 32. LCD controller 56 may generally govern operation of LCD panel 30. LED drivers 60 may power and drive one or more strings of LEDs 48 mounted within backlight 32.

Figure 4:
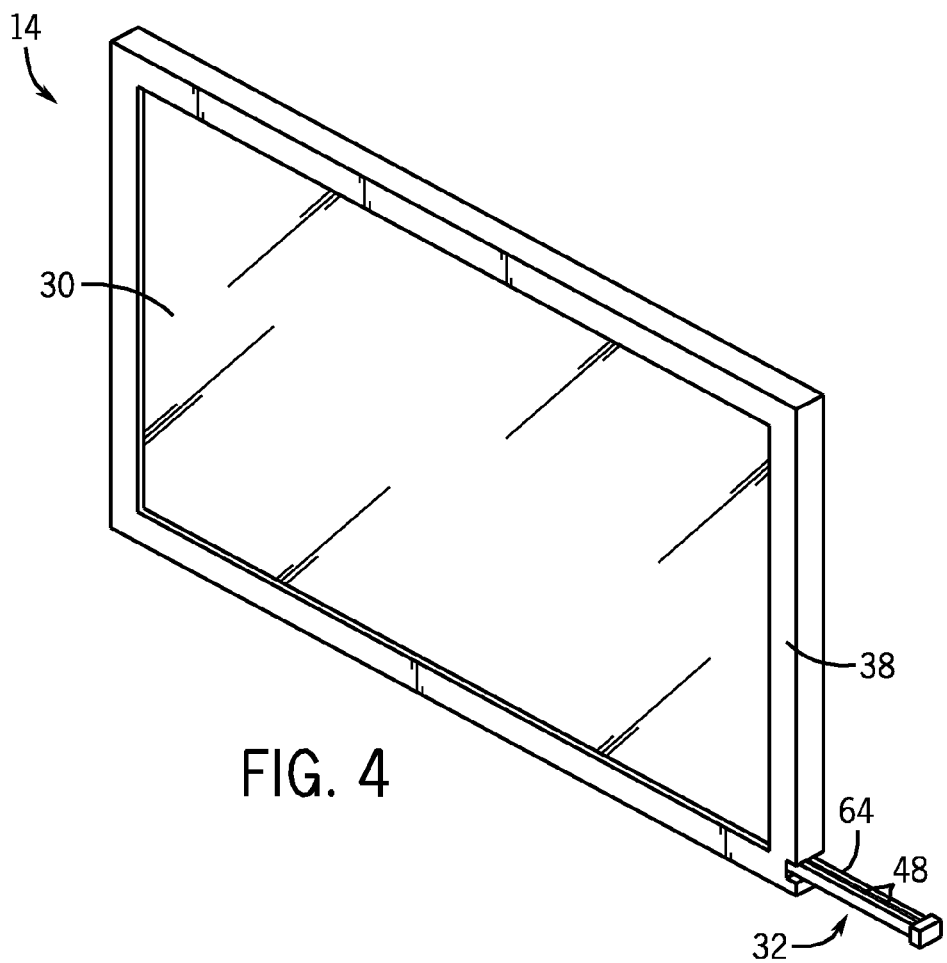
FIG. 4 is a perspective view of an edge-lit LCD display that may be used in the electronic device of FIG. 1, in accordance with aspects of the present disclosure.

FIG. 4 illustrates an embodiment of display 14 that employs an edge-lit backlight 32. Backlight 32 may include light strip 64 inserted within frame 38. Light strip 64 may include multiple LEDs 48, such as side-firing LEDs, mounted on a flexible strip. LEDs 48 may direct light upwards towards LCD panel 30, and in certain embodiments, a guide plate may be included within backlight 32 to direct the light from LEDs 48. Although not shown in FIG. 4, backlight 32 may include additional components, such as a light guide plate, diffuser sheets, circuit boards, and controllers among others. Further, in other embodiments, multiple light strips 64 may be employed around the edges of display 14.

2. Dynamic Mixing

Figure 5:
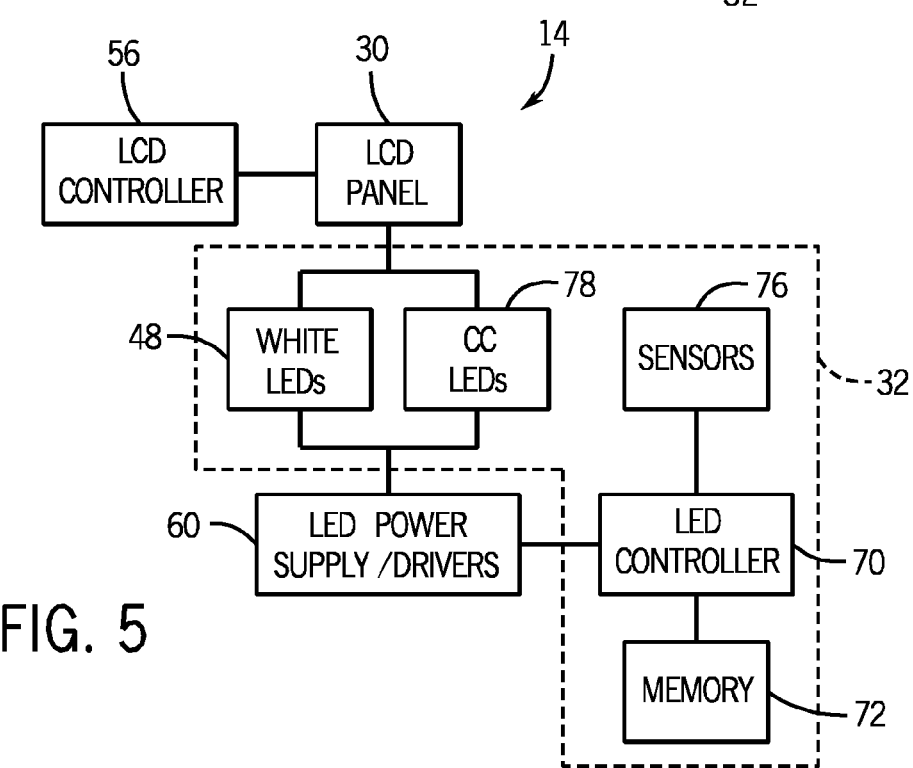
FIG. 5 is a block diagram of an example of components of an LCD display, in accordance with aspects of the present disclosure.

Additional details of illustrative display 14 may be better understood through reference to FIG. 5, which is a block diagram illustrating various components and features of display 14. Display 14 includes LCD panel 30, LED backlight 32, LCD controller 56, and LED drivers 60, and possibly other components. As described above with respect to FIG. 3, LED backlight 32 may act as a light source for LCD panel 30. To illuminate LCD panel 30, LEDs 48 may be powered by LED drivers 60. Each driver 60 may drive one or more strings of LEDs 48, with each string containing LEDs 48 that emit light of a similar color and/or brightness.

Specifically, LEDs 48 may include groups of LEDs selected from different bins defining properties of the LEDs, such as color or chromaticity, flux, and/or forward voltage. LEDs 48 from the same bin may generally emit light of a similar color and/or brightness. LEDs 48 from the same bin may be joined together in one or more strings, with each string being independently driven by a separate driver or driver channel. The strings may be spatially distributed throughout backlight 32 to emit a light that when mixed substantially matches the target white point. For example, an emitted white point that substantially matches the target white point may be within approximately 0 to 5 percent of the target white point, as well as all subranges therebetween. More specifically, the emitted white point may be within approximately 0 to 1 percent, 0 to 0.5 percent, or 0 to 0.1 percent of the target white point. In certain embodiments, the strings may be interlaced throughout the backlight, while, in other embodiments, certain strings may be positioned within only portions of the backlight. Further, the strings may be positioned in a patterned or random orientation. The driving strength of some or all of the strings may be adjusted to achieve a white point that substantially matches the target white point. In certain embodiments, the individualized driving strength adjustment of LED strings may allow a greater number of LED bins to be used within backlight 32.

The LED strings may be driven by drivers 60. Drivers 60 may include one or more integrated circuits that may be mounted on a printed circuit board and controlled by LED controller 70. In certain embodiments, drivers 60 may include multiple channels for independently driving multiple strings of LEDs 48 with one driver 60. Drivers 60 may include a current source, such as a transistor, that provides current to LEDs 48, for example, to the cathode end of each LED string. Drivers 60 also may include voltage regulators. In certain embodiments, the voltage regulators may be switching regulators, such as pulse width modulation (PWM) regulators.

LED controller 70 may adjust the driving strength of drivers 60. Specifically, LED controller 70 may send control signals to drivers 60 to vary the current and/or the duty cycle to LEDs 48. For example, LED controller 70 may vary the amount of current passing from driver 60 to LEDs 48 to control the brightness and/or the chromaticity of the LEDs 48, for example, using amplitude modulation (AM). In certain embodiments, the amount of current passing through strings of LEDs 48 may be adjusted to produce a white point that substantially matches the target white point. For example, if the emitted white point has a blue tint when compared to the target white point, the current through a string of yellow tinted LEDs may be increased to produce an output that substantially matches the target white point. By increasing the current through strings of LEDs 48, the overall brightness of backlight 32 also may increase. In other embodiments, the ratio of the currents passing through LED strings may be adjusted to emit a white point that substantially matches the target white point while maintaining a relatively constant brightness.

The LED controller 70 also may adjust the driving strength of drivers 60 by varying the duty cycle, for example, using pulse width modulation (PWM). For example, LED controller 70 may increase the frequency of an enable signal to a current source to increase the driving strength for a string of LEDs 48 powered by that current source. The duty cycles for different LED strings may be increased and/or decreased to produce a white point that substantially matches the target white point. For example, if the emitted white point has a green tint when compared to the target white point, the duty cycle for a string of purple tinted LEDs 48 may be increased to produce light that substantially matches the target white point.

When adjusting the driving strength through AM, PWM, or other similar techniques, LED controller 70 may increase the driving strength of certain strings, decrease the driving strength of certain strings, or increase the driving strength of some strings and decrease the driving strength of other strings. LED controller 70 may determine the direction of the white point shift, and then increase the driving strength of strength of one or more LED strings with a color complementary to the white point shift. For example, if the white point has shifted towards a blue tint, LED controller 70 may increase the driving strength of yellow tinted strings. LED controller 70 also may decrease the driving strength of one or more LED strings with a tint similar to the direction of the white point shift. For example, if the white point has shifted towards a blue tint, the controller may decrease the driving strength of blue tinted strings.

LED controller 70 may govern operation of driver 60 using information stored in memory 72. For example, memory 72 may store values defining the target white point as well as calibration curves, tables, algorithms, or the like, defining driving strength adjustments that may be made to compensate for a shift in the white point. In certain embodiments, LED controller 70 may dynamically adjust the driving strengths throughout operation of backlight 32 to maintain a light output that matches the target white point. For example, LED controller 70 may receive feedback from sensors 76 describing properties of the emitted light. Sensors 76 may be mounted within backlight 32 or within other components of display 14. In certain embodiments, sensors 76 may be optical sensors, such as phototransistors, photodiodes, or photoresistors, among others, that sense the color and/or brightness of the light emitted by backlight 32. In other embodiments, sensors 76 may be temperature sensors that sense the temperature of backlight 32. Using the feedback from sensors 76, LED controller 70 may adjust the driving strengths to maintain a light output that matches the target white point and/or brightness.

In other embodiments, LED controller 70 may receive feedback from other sources instead of, or in addition to, sensors 76. For example, LED controller 70 may receive user feedback through input structure 16 (FIG. 2) of electronic device 10. Electronic device 10 may include hardware and/or software components allowing user adjustment of the white point emitted by backlight 32. In certain embodiments, display 14 may include a color temperature control that allows a user to select the color temperature (for example, from a small set of fixed values) of the light emitted when display 14 receives an electrical signal corresponding to a white light. LED controller 70 also may receive feedback from device 10 or from backlight 32. For example, backlight 32 may include a clock that tracks total operating hours of backlight 32. In certain embodiments, LED controller 70 may compare the operating hours to a calibration curve or table stored in memory 72 to determine a driving strength adjustment. In other embodiments, LED controller 70 may receive feedback from LCD controller 56 or processor 22 (FIG. 2). The feedback may include data describing an operating state of backlight 32 or of electronic device 10. For example, the feedback may specify the amount of time since backlight 32 or electronic device 10 has been powered on.

Based on the feedback received from sensors 76, device 10, or backlight 32, LED controller 70 may adjust the driving strength of LEDs 48. In certain embodiments, LED controller 70 may determine which strings should be adjusted. The determination may be made based on the color of the LEDs in the string, or the location of the string within backlight 32, among other factors.

In certain embodiments, the backlight may include color compensating LEDs 78, in addition to white LEDs 48. The color compensating LEDs may be LEDs of any color and may be selected based on the white point shift generally seen within backlight 32. In a backlight 32 employing phosphor based white LEDs, the white point may shift towards the color of the LED die as the LED ages. For example, as a blue die coated with a yellow phosphor ages, the blue spectrum emitted by the die may decrease. However, the excited spectrum emitted by the yellow phosphor that mixes with the blue spectrum to produce white light may decrease at a higher rate than the blue spectrum. Therefore, the light emitted may shift towards a blue tint. To compensate for this shift, color compensating LEDs 78 may have a yellow color or tint. In another example, a blue die coated with red and green phosphor materials may shift towards a blue tint, as the red and green excitement spectrums decrease at a faster rate than the blue spectrum. In this example, color compensating LEDs 78 may include intermixed red and green LEDs to compensate for the shift.

Color compensating LEDs 78 may be positioned at various locations throughout backlight 32. In certain embodiments, LED controller 70 may only adjust the driving strength of color compensating LEDs 78 while maintaining the driving strength of white LEDs 48 at a constant rate. However, in other embodiments, color compensating LEDs 78 may be adjusted along with adjustment of white LEDs 48.

Figure 6:
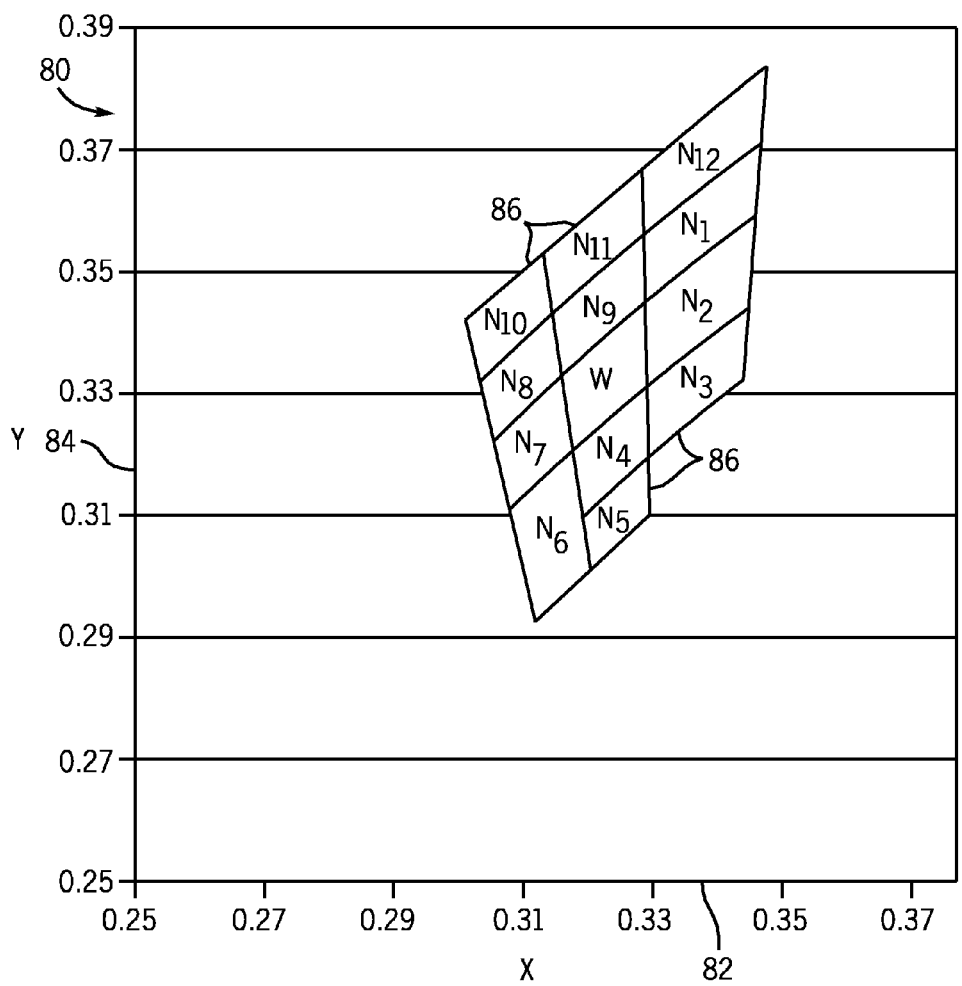
FIG. 6 is a diagram illustrating LED bins, in accordance with aspects of the present disclosure.

As described above with respect to FIG. 5, LEDs 48 may be selected from multiple bins, with each bin defining color and/or brightness properties of the LEDs, such as color, brightness, forward voltage, flux, and tint, among others. FIG. 6 illustrates a representative LED bin chart 80, such as from a commercial LED manufacturer, that may be used to group LEDs into bins, with each bin of LEDs exhibiting a different white point. Bin chart 80 may generally plot chromaticity values, describing color as seen by a standard observer, on x and y axes 82 and 84. For example, bin chart 80 may use chromaticity coordinates corresponding to the CIE 1931 chromaticity diagram developed by the International Commission on Illumination (CIE). In certain embodiments, the CIE D series of standard illuminates may be employed, with D65 representing standard D65 representing standard daylight and corresponding to a color temperature of 6,500 K. On bin chart 80, x-axis 82 may plot the x chromaticity coordinates, which may generally progress from blue to red along x-axis 82, and y-axis 84 may plot the y chromaticity values, which may generally progress from blue to green along y-axis 84.

Each LED backlight 32 may have a reference or target white point, represented by a set of chromaticity coordinates, tristimulus values, or the like. For example, in certain embodiments, the CIE D series of standard illuminants may be used to select the target white point. LEDs for each backlight 32 may be selected so that when the light from each of the LEDs 48 is mixed, the emitted light may closely match the target white point. In certain embodiments, LEDs 48 also may be positioned within an LED backlight to reduce local variations in the color of the light emitted by backlight 32.

LEDs 48 with a light output close to the target white point may be selected to assemble LED backlight 32 with a light output that substantially matches the target white point. For example, as shown on chart 80, bin W may encompass the target white point. A backlight employing all bin W LEDs may substantially match the target white point. However, manufacturing costs may be reduced if a larger number of bins are used within a backlight. Accordingly, LEDs from neighboring bins $N_{1-12}$, for example, may be employed within the backlight. The LEDs from the neighboring bins $N_{1-12}$ may be selectively positioned, interlaced, or randomly mixed within a backlight to produce an output close to the target white point. The LEDs from the same bin may be joined on separate strings, so that the driving strength of LEDs from different bins may be independently adjusted, for example through AM or PWM, to more closely align the emitted light with the target white point.

In certain embodiments, LEDs from two or more neighboring bins $N_{1-12}$ may be selected and mixed within an LED backlight. For example, a backlight may employ LEDs from complementary bins $N_9$ and $N_4$; complementary bins $N_3$ and $N_8$; complementary bins $N_{12}$ and $N_6$; or complementary bins $N_9$, $N_7$, and $N_2$. Moreover, LEDs from the target white point bin W and from the neighboring bins $N_{1-12}$ may be mixed to yield the desired white point. For example, a backlight may employ LEDs from bins W, $N_7$, and $N_2$; bins W, $N_{11}$, and $N_5$; or bins W, $N_1$, and $N_6$. Further, color compensating LEDs 78 may be included with white LEDs 48. Of course, any suitable combination of bins may be employed within a backlight. Further, a wider range of bins that is shown may be employed.

Figure 7:
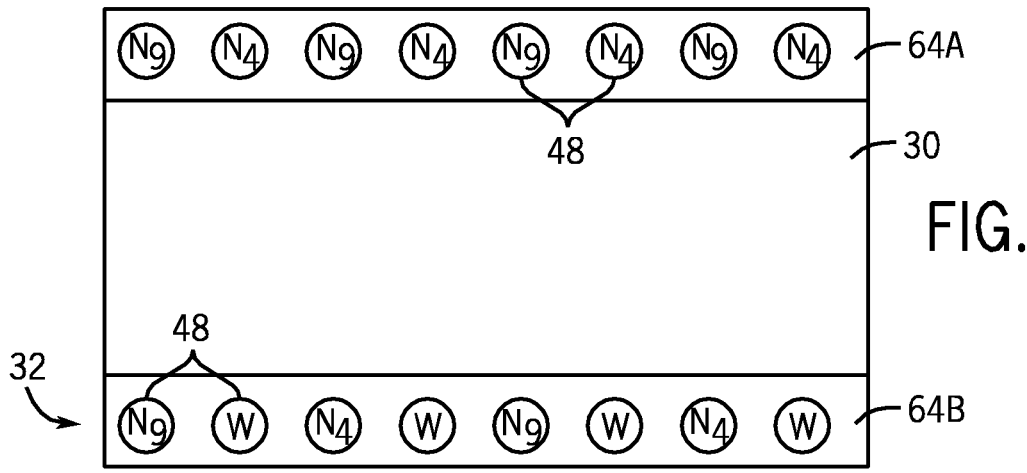
FIG. 7 is a front view of an LED backlight illustrating an example of an LED configuration, in accordance with aspects of the present disclosure.
Figure 8:
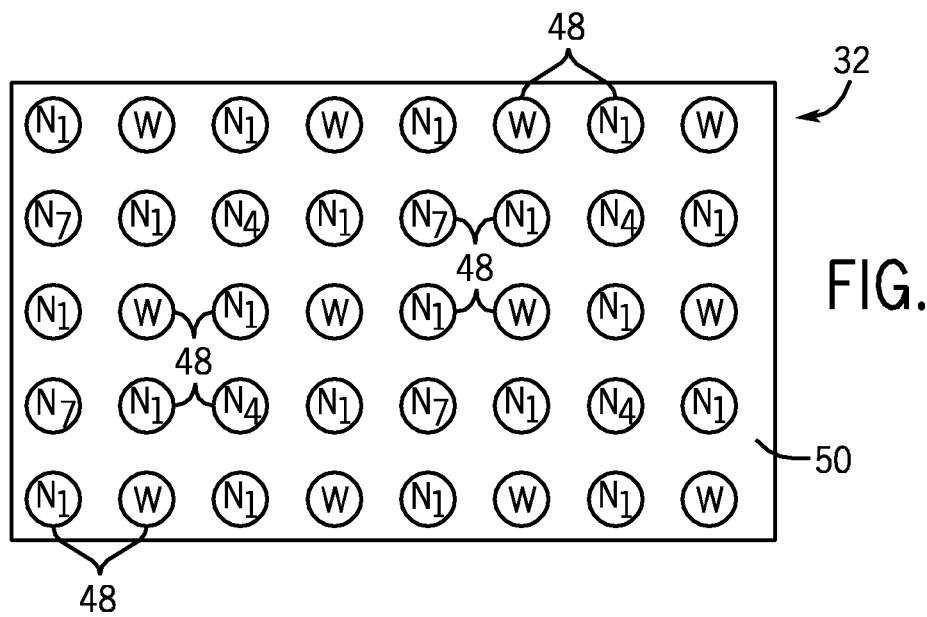
FIG. 8 is a front view of an LED backlight illustrating another example of an LED configuration, in accordance with aspects of the present disclosure.
Figure 9:
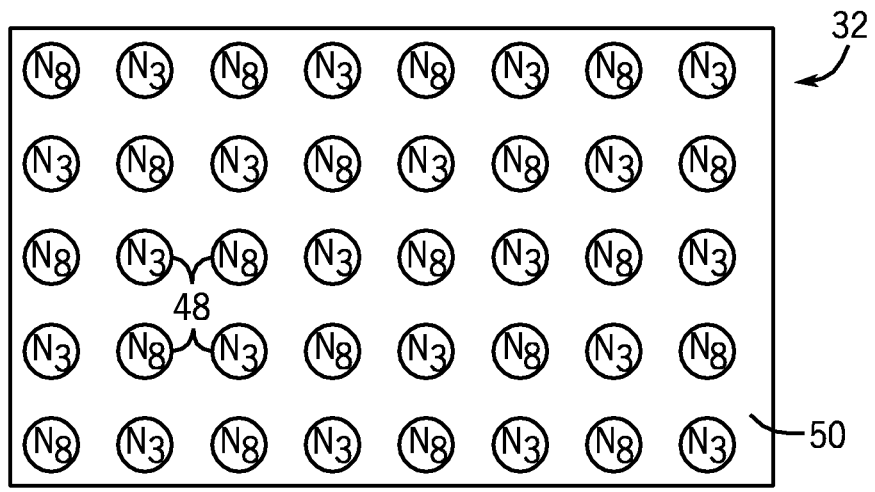
FIG. 9 is a front view of an LED backlight illustrating another example of an LED configuration, in accordance with aspects of the present disclosure.

FIGS. 7-9 illustrate embodiments of LED arrangements that may be employed within backlights 32. FIG. 7 depicts an embodiment of backlight 32 that includes two light strips 64A and 64B. LEDs from different bins may be employed within each light strip 64A and 64B. Specifically, upper light strip 64A includes LEDs from bins $N_4$ and $N_9$, while lower light strip 64B includes LEDs from bins $N_9$, $N_4$, and W. The LEDs from each bin may be grouped into separate strings so the driving strength may be independently adjusted for each bin to fine tune backlight 32 to the desired white point. In other embodiments, the LED bins employed may vary.

FIGS. 8 and 9 illustrate embodiments of backlight 32 with LEDs 48 mounted in array tray 50. In FIG. 8, LEDs from bins W, $N_1$, and $N_7$ are arranged in backlight 32. Bins $N_1$ and $N_7$ may represent complementary bins selected from opposite sides of white point bin W. In FIG. 9, white point bin W is not present. However, LEDs from complementary neighboring bins $N_3$ and $N_8$ have been positioned throughout backlight 32. In other embodiments, multiple patterns or random orders of LEDs from LEDs from any number of neighboring bins $N_{1-12}$ may be included within backlight 32. Further, the number of different bins $N_{1-12}$, and W employed may vary.

Figure 10:
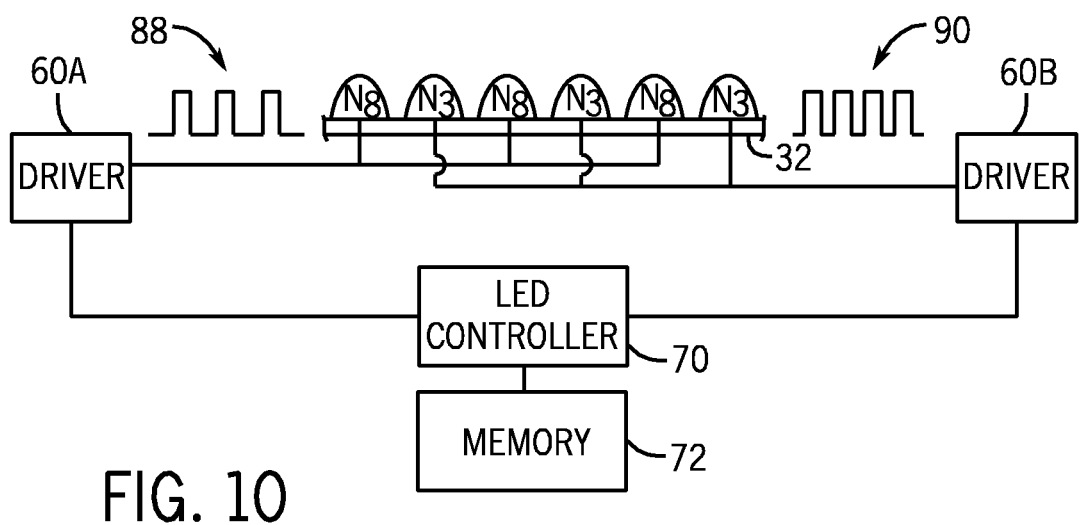
FIG. 10 is a schematic diagram illustrating operation of the LED backlight of FIG. 9, in accordance with aspects of the present disclosure.

FIG. 10 is a schematic diagram illustrating operation of LED backlight 32 shown in FIG. 9. The LEDs from each bin $N_3$ and $N_8$ are organized into separate strings, each driven by a separate driver 60A or 60B. Specifically, the string of bin $N_8$ LEDs is connected to driver 60A and the string of bin $N_3$ LEDs is connected to driver 60B. Each driver 60A and 60B is communicatively coupled to LED controller 70. In certain embodiments, LED controller 70 may transmit control signals to vary the driving strength of each driver. For example, to adjust the white point, LED controller 70 may send signals to drivers 60A and 60B to vary PWM duty cycles 88 and 90. As shown, driver 60 currently energizes the bin $N_8$ LEDs at PWM duty cycle 88 that has about half the frequency of PWM duty cycle 90 applied by driver 60B to the bin $N_3$ LEDs. However, if LED controller 70 determines that a white point adjustment should be made, LED controller 70 may vary one or both of duty cycles 88 and 90 to adjust the white point to match the target white point.

In certain embodiments, control signals corresponding to the white point adjustments may be stored within memory 72. During operation of the backlight, LED controller 70 may make continuous or period adjustments to duty cycles 88 and 90 to maintain a light output that substantially matches the target white point. The independent driving strengths for LEDs from each bin $N_3$ and $N_8$ may allow more precise mixing of the light output from each bin of LEDs to achieve the target white point. Further, although the adjustments are shown in the context of PWM duty cycles, in other embodiments, LED controller 70 may adjust the level of the current applied to drivers 60A and 60B instead of, or in addition to varying duty cycles 88 and 90.

Figure 11:
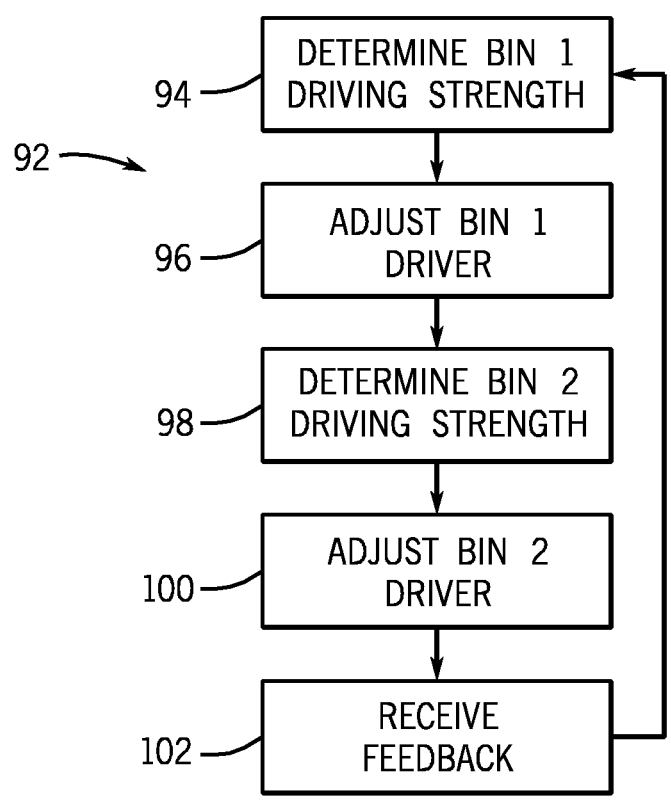
FIG. 11 is a flowchart depicting a method for operating an LED backlight, in accordance with aspects of the present disclosure.

FIG. 11 depicts a flowchart of a method 92 for dynamically driving LEDs within a backlight. The method may begin by determining (block 94) a driving strength for LEDs selected from a first bin, such as bin $N_8$ shown in FIG. 10. For example, LED controller 70 (FIG. 10) may set the driving strength based on data, such as manufacturer settings, calibration curves, tables, or the like, stored in memory 72. In certain embodiments, LED controller 70 may determine the driving strength based on feedback received from one or more sensors 76 (FIG. 5). In other embodiments, a user may enter the driving strength through the GUI, for example, through input structure 16, of device 10. In these embodiments, I/O controller 34 (FIG. 2) may transmit driving strength information from processor 22 (FIG. 2) to display 14. Further, in yet other embodiments, LED controller 70 may retrieve the driving strength from processor 22 (FIG. 2). For example, electronic device 10 may execute hardware and/or software programs to determine the driving strength based on user input, feedback received from sensors 76, external inputs received from other electronic devices, or combinations thereof.

After determining the driving strength, LED controller 70 may adjust (block 96) the driver for the LEDs from the first bin. For example, as shown in FIG. 10, LED controller 70 may send a control signal to driver 60A to adjust the driving strength of the LEDs from bin $N_8$. In certain embodiments, the control signal may adjust the level of the current or the duty cycle of the current passing from driver 60 to the LEDs.

LED controller 70 may then determine (block 98) the driving strength for LEDs selected from a second bin, such as bin $N_3$ shown in FIG. 10. LED controller 70 may determine the driving strength based on data stored in memory 72, data retrieved from processor 22, data input by a user, and/or feedback received from sensors 76 (FIG. 5) among others. The LED controller may then adjust (block 100) the driver for the LEDs from the second bin. For example, as shown in FIG. 10, LED controller 70 may send a control signal to driver 60B to adjust the driving strength of the LEDs from bin $N_3$, for example by using AM or PWM.

The drivers 60A and 60B may then continue to drive the LEDs from the first and second bins at independent driving strengths until LED controller 70 receives (block 102) feedback. For example, LED controller 70 may receive feedback from sensors 76 (FIG. 5) indicating that the white point has shifted from the target white point. In another example, LED controller 70 may receive feedback from a user, through the GUI of electronic device 10. In yet another embodiment, LED controller 70 may receive feedback from processor 22 (FIG. 2) indicating an operating state of device 10. For example, a clock within device 10 may provide feedback that a specified time has elapsed, and LED controller 70 may adjust the drivers accordingly. In other embodiments, LED controller 70 may receive feedback indicating an operating state of device 10 from a device, such as a clock, indicated within LED controller 70.

In response to the feedback, LED controller 70 may again determine (block 94) the driving strength of the LEDs from the first bin. The method 92 may continue until all driving strengths have been adjusted. Moreover, in other embodiments, LED controller 70 may adjust the driving strengths for any number of LED bins. For example, LED controller 70 may adjust the driving strength for LEDs from one, two, three, four, five, or more bins. The independent driving strength adjustments may be made using individual drivers or separate channels within the same driver. In certain embodiments, LED controller 70 may adjust the driving strength of only some of the LED strings, while other LED strings remain driven at a constant rate. Further, in certain Further, in certain embodiments, LEDs from the same bin may be grouped into more than one string, with each string being individually adjusted.

Figure 12:
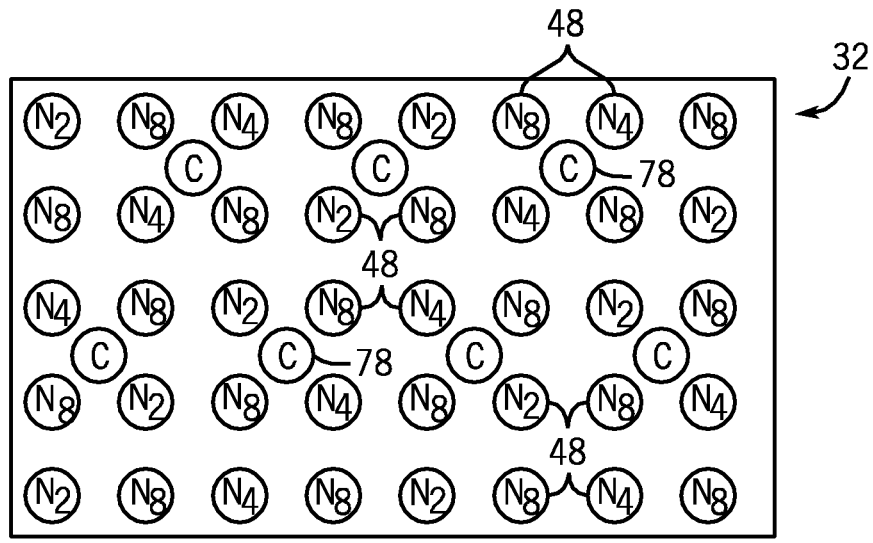
FIG. 12 is a front view of an LED backlight with color compensating LEDs, in accordance with aspects of the present disclosure.

FIG. 12 illustrates an embodiment of LED backlight 32 that may employ color compensating LEDs 78 to achieve the desired white point. The color compensating LEDs 78 may be intermixed between white LEDs 48 and may be grouped together into one or more strings. The strings of color compensating LEDs 78 may be separate from the strings of white LEDs 49 to allow the driving strength of color compensating LEDs 78 to be adjusted independently from the driving strength of white LEDs 48. In other embodiments, the orientation of color compensating LEDs 78 may vary. Further, any number of color compensating LEDs 78 may be used and dispersed throughout backlight 32 or located within various regions of backlight 32.

The color compensating LEDs 78 may include LEDs selected from a bin C. As described above with respect to FIG. 5, bin C for color compensating LEDs 78 may represent a color designed to compensate for a white point shift. In certain embodiments, bin C may be selected based on white point shifts experienced by LEDs within backlight 32. For example, certain backlights may experience a white point shift towards a blue tint. In these backlights, color compensating LEDs 78 may be selected from a yellow color spectrum to allow compensation for the blue shift.

Figure 13:
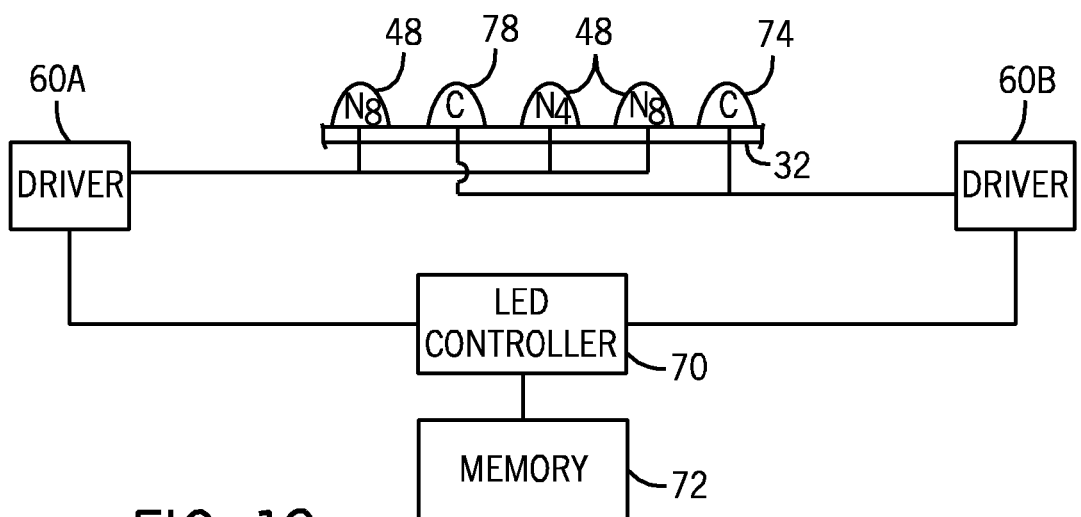
FIG. 13 is a schematic diagram illustrating operation of the LED backlight of FIG. 12, in accordance with aspects of the present disclosure.

FIG. 13 is a schematic diagram illustrating operation of the LED backlight of FIG. 12. Color compensating LEDs 78 are joined together in a string driven by one driver 60B. White LEDs 48 are joined together in another string driven by another driver 60A. However, in other embodiments, white LEDs 48 and color compensating LEDs 78 may be driven by separate channels of the same driver. Moreover, in certain Moreover, in certain embodiments, white LEDs 48 may be driven at separate driving strengths, using individual drivers or channels.

As shown, driver 60A may drive white LEDs 48 at a constant driving strength; while driver 60B varies the driving strength of color compensating LEDs 48 maintain the target white point. In certain embodiments, LED controller 70 may continuously vary or periodically vary the driving strength of driver 60B to maintain the target white point. Further, in certain embodiments, driver 60B may not drive color compensating LEDs 78 until white point compensation is desired.

Figure 14:
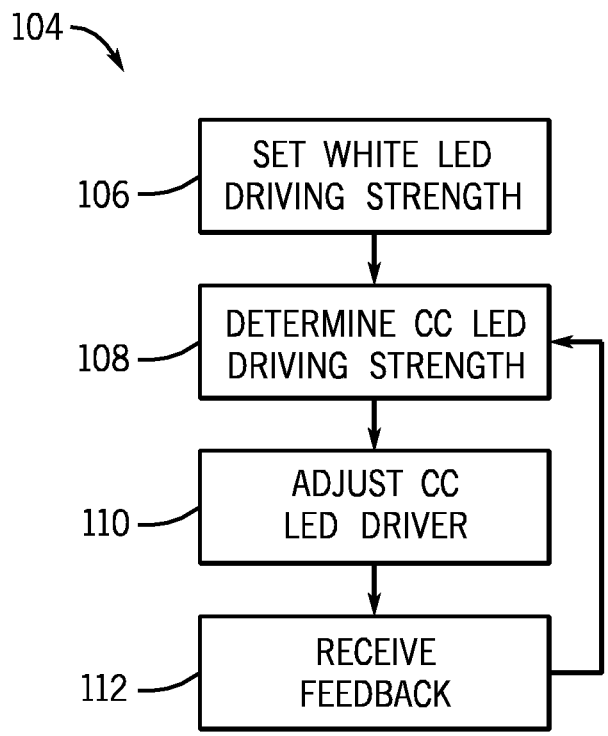
FIG. 14 is a flowchart depicting a method for operating an LED backlight with color compensating LEDs, in accordance with aspects of the present disclosure.

FIG. 14 is a flowchart depicting a method 104 for employing color compensating LEDs 78 to achieve the target white point. The method may begin by setting (block 106) the driving strength of the white LEDs. For example, as shown in FIG. 13, LED controller 70 may set driver 60A to a desired driving strength to drive the white LEDs from bins $N_8$ and $N_4$ at a constant rate. Each string of white LEDs may be driven at the same or different rates. After setting the white LED driving strength, LED controller 70 may determine (block 108) the driving strength of color compensating LEDs 78. The driving strength may be determined based on user input, information stored in memory 72 (FIG. 13), feedback from sensors 76 (FIG. 5), and/or information received from device 10, as described above with respect to FIG. 11. In certain embodiments, LED controller 70 may use the input or information to determine the direction and/or amount of deviation from the target white point. Based on the deviation, LED controller 70 may then determine a driving strength that may compensate for the deviation.

The controller may then adjust (block 110) the color compensating LED LED driver to the determined driving strength. For example, as shown in FIG. 13, LED controller 70 may adjust driver 60B to the determined driving strength. Drivers 60A and 60B may then drive LEDs 48 and 78 at their respective driving strengths until additional feedback is received (block 112). The feedback may include information from sensors 76 (FIG. 5), processor 22 (FIG. 2), a user input, or the like, that indicates that a white point adjustment is needed. For example, sensors 76 may transmit information, such as color or temperature values, to LED controller 70 to indicate a white point shift. After receiving (block 112) feedback, LED controller 70 may again determine (block 108) a driving strength for the color compensating LEDs.

In certain embodiments, methods 92 and 104, shown in FIGS. 11 and 14, may be combined to allow dynamic adjustment of both the driving strengths of color compensating LEDs 78 and white LEDs 48. For example, in certain situations, a driving strength adjustment of the color compensating LEDs may not fully compensate for the white point deviation. In these situations, the driving strength of white LEDs 48 also may be adjusted to achieve the target white point. Moreover, in certain embodiments, methods 92 and 94 may be employed during different operational states or periods of device 10. For example, if the white point deviation is caused by aging of the backlight components, the driving strength of the color compensating LEDs may be used to compensate for the deviation as illustrated in FIG. 14. However, if the white point deviation is high ambient temperature, the driving strength of white LEDs 48 may be adjusted to compensate for the deviation as illustrated in FIG. 11. In another example, backlight 32 may experience white point deviation during startup of LEDs 48. The driving strength of white LEDs 48, color compensating LEDs 78, or a combination thereof, may be adjusted during the startup period. In other embodiments, the method 92 92 or 94 selected may depend on the operational hours backlight 32 has experienced, the magnitude of the deviation from the white point, or the direction of the deviation from the white point, among others. As will be appreciated, the operating states and periods are provided by way of example only, and are not intended to be limiting. The methods 92 and 94 may be used in conjunction with each other or independently in a variety of operational states or periods.

Figure 15:
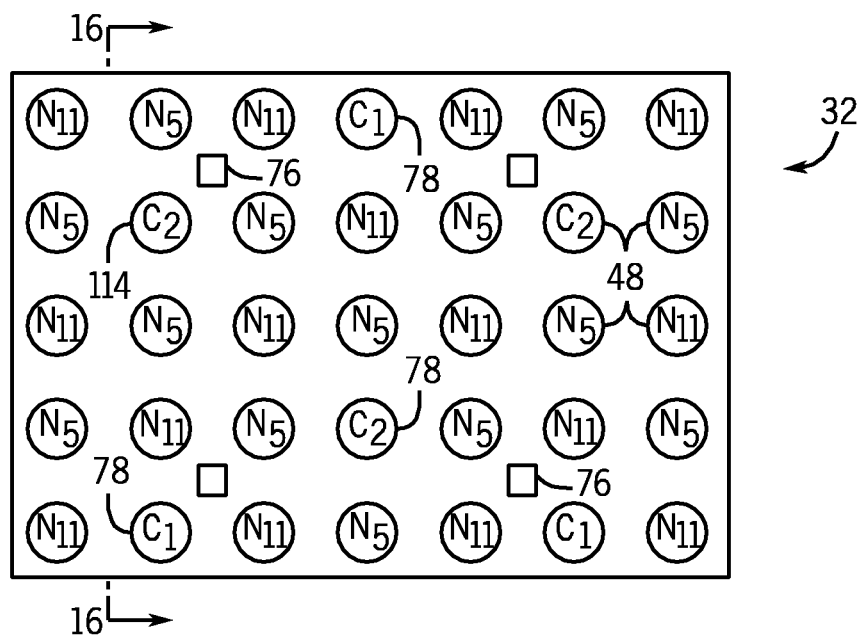
FIG. 15 is a front view of an LED backlight with sensors for adjusting driving strength of the LEDs, in accordance with aspects of the present disclosure.

FIG. 15 depicts an embodiment of backlight 32 that incorporates sensors 76. Sensors 76 may include optical sensors, temperature sensors, or combinations thereof. For example, in certain embodiments, sensors 76 may include phototransistors that generate signals whose magnitude is related to the brightness of the LEDs. In other embodiments, the sensors may include photo diodes, photo resistors, or other optical sensors that detect the color and/or brightness of the light emitted by LEDs 48 and 78. In another example, sensors 76 may include temperature sensors that sense the temperature of backlight 32. In these embodiments, LED controller 70 may use the temperature data to determine a white point adjustment. Any number and arrangement of sensors 76 may be included within backlight 32. Further, in certain embodiments, sensors 76 may be located in other locations of backlight 32, such as the back of array tray 50 (FIG. 3) or frame 38 (FIG. 3), among others.

Figure 16:
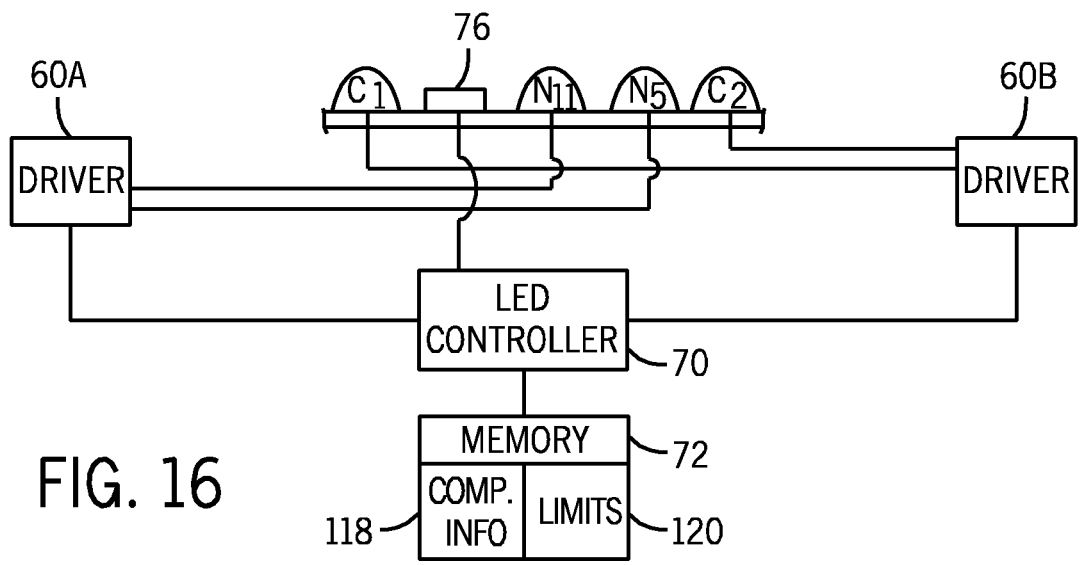
FIG. 16 is a schematic diagram illustrating operation of the LED backlight of FIG. 15, in accordance with aspects of the present disclosure.

FIG. 16 is a schematic diagram illustrating operation of backlight 32 shown in FIG. 15. Sensors 76 may be communicatively coupled to LED controller 70 to provide feedback to LED controller 70 for adjusting the driving strength of drivers 60A and 60B. For example, sensors 76 may detect chromaticity values of the light emitted by LEDs 48 and 78 and may send signals corresponding to these values to LED controller 70. LED controller 70 may use these signals to determine a driving strength adjustment adjustment for drivers 60A and 60B, and may, in turn, transmit control signals to drivers 60A and 60B to vary their driving strength.

The backlight 32 of FIGS. 15 and 16 includes white LEDs from bins $N_5$ and $N_{11}$, and includes color compensating LEDs 78 from two different bins $C_1$ and $C_2$. The LEDs from each bin are joined together into strings, with each string being independently driven by a channel of one of the drivers 60A or 60B. Bins $C_1$ and $C_2$ may include colored LEDs designed to compensate for a white point shift. For example, in a backlight employing phosphor based LEDs with red and green phosphor materials, bin $C_1$ may encompass a red spectrum, and bin $C_2$ may encompass a green spectrum.

In response to receiving feedback from sensors 76, LED controller 70 may determine a driving strength adjustment. For example, LED controller 70 may receive chromaticity values or temperature values from sensors 76, and may compare these values to compensation information 118 stored within memory 72. The compensation information 118 may include calibration curves, algorithms, tables, or the like that LED controller 70 may use to determine a driving strength adjustment based on the feedback received from sensors 76. In certain embodiments, compensation information 118 may include algorithms for determining the direction and amount of deviation from the target white point. Compensation information 118 also may specify the amount of driving strength adjustment as well as which strings of LEDs 48 and 78 should be adjusted based on the white point deviation.

The memory 72 also may include limits 120 that specify maximum values, minimum values, ratios, or ranges for the driving strengths. Before making the driving strength adjustments, LED controller 70 may ensure that the new driving strengths fall within limits 120. For example, limits 120 may ensure that only a small difference exists between the driving strengths to prevent visible artifacts on LCD panel 30 (FIG. 2).

Figure 17:
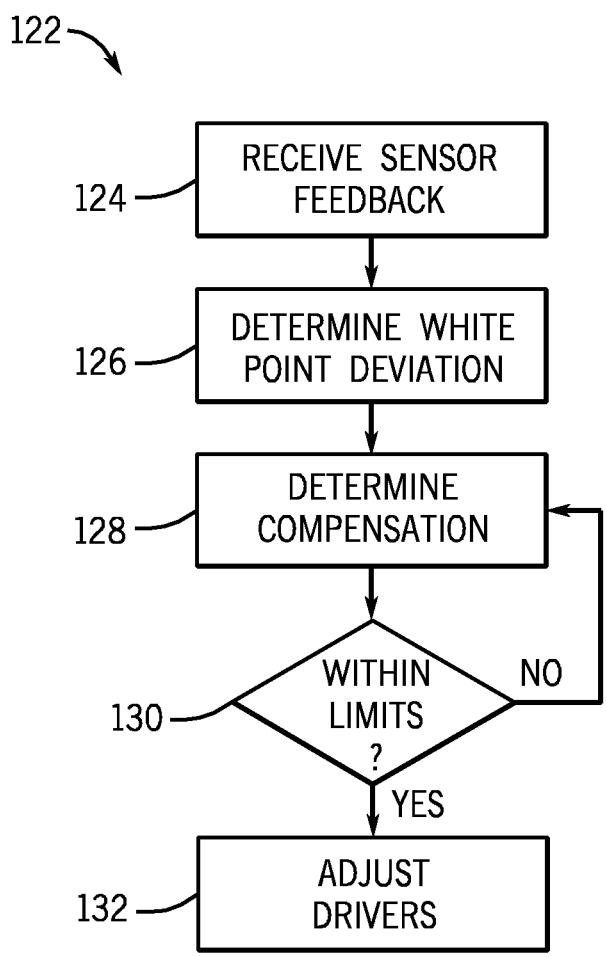
FIG. 17 is a flowchart depicting a method for operating an LED backlight employing sensors, in accordance with aspects of the present disclosure.

FIG. 17 depicts a flowchart of a method 122 for employing sensors to maintain a target white point. Method 122 may begin by receiving (block 124) sensor feedback. For example, as shown in FIG. 16, LED controller 70 may receive feedback from sensors 76. The feedback may be in the form of electrical signals representing the brightness, chromaticity values, temperature, or other data that LED controller 70 may use to determine the white point emitted by backlight 32. LED controller 70 may then determine (block 126) the deviation from the target white point, for example, using algorithms, tables, calibration curves, routines, or the like, stored within memory 72. For example, LED controller 70 may receive chromaticity values from sensors 76. Based on the chromaticity values, LED controller 70 may determine the white point deviation. For example, LED controller 70 may compare the chromaticity values to target white point values stored within memory 72 to determine whether the emitted light is too blue or yellow when compared to the target white point.

After determining the white point deviation, LED controller 70 may then determine (block 128) the white point compensation. In certain embodiments, based on the direction of the white point deviation, LED controller 70 may determine which strings of LEDs should receive driving strength adjustments. For example, if the white point deviation reveals that the emitted light is too purple, LED controller 70 may determine a driving strength adjustment for driving LEDs from a green bin at an increased driving strength. In one example, as shown in FIG. 16, the color compensating LEDs from bin $C_2$ may emit a green spectrum, while the color compensating LEDs from compensating LEDs from $C_1$ may emit a red spectrum. If the light emitted is too purple, the LED controller may 1) drive the $C_2$ LEDs at a higher driving strength, 2) drive the $C_1$ LEDs and a lower driving strength, or 3) may adjust the ratio of the $C_1$ and $C_2$ driving strengths. As described above with respect to FIGS. 5 and 10-11, LED controller 70 may employ AM, PWM, or other suitable techniques to vary the driving strength.

Once the new driving strengths have been determined, LED controller 70 may determine (block 130) whether the adjustments are within limits. For example, as shown in FIG. 16, LED controller 70 may determine whether the new driving strengths for drivers 60A and 60B fall within limits 120 stored within memory 72. In certain embodiments, limits 120 may improve consistency across backlight 32 and LCD panel 30, and may reduce visible artifacts.

If the determined compensation is not within the limits, LED controller 70 may again determine the compensation (block 128). For example, LED controller 70 may determine different driving strength values or ratios that still compensate for the white point deviation. Once the compensation is within the limits, LED controller 70 may then adjust (block 132) the drivers to the determined driving strengths. Of course, in certain embodiments, limits 120 may not be included, and block 130 may be omitted.

The driving strength adjustments described in FIGS. 5-17 may be used with a variety of backlights including white point LEDs 48, color compensating LEDs 78, or combinations thereof. Further, the adjustments may be used with backlights incorporating LEDs from any number of bins. The adjustments may be made periodically or continuously throughout operation of the backlight. However, in certain embodiments, the driving strength adjustments may be particularly useful in compensating for white compensating for white point deviation that occurs over time due to aging of LEDs 48 and 78 and other backlight or display components. For example, over time the brightness and/or color output of LEDs may change.

3. Aging Compensation

FIG. 18 is a chart illustrating how the luminance of backlight 32 may shift over time. Y-axis 138 indicates the luminance of the backlight in Nits, and the x-axis 140 indicates the operational life of the backlight, measured here in hours. Curve 142 illustrates how luminance 138 may decrease as operational time 140 increases. As noted above, a change in the luminance of backlight 32 may cause the white point to shift.

FIG. 19 depicts chart 144, which illustrates how the chromaticity of a backlight may shift over time as LEDs 48 and 78 and other components age. Specifically, chart 144 illustrates the change in chromaticity for a backlight that includes yellow phosphor LEDs. Y-axis 146 shows the chromaticity values, and x-axis 148 shows the operational life of the backlight in hours. The x chromaticity values are shown by curve 150, and the y chromaticity values are shown by curve 152. As shown by curve 150, the x values may generally shift from red to blue with age. As shown by curve 152, the y values may generally shift from yellow to blue with age. Overall, the white point of the backlight may shift towards a bluish tint. Therefore, to maintain the desired white point, the driving strength of strings of LEDs with a yellow and/or red tint may increased over time to compensate for the white point shift.

Figure 20:
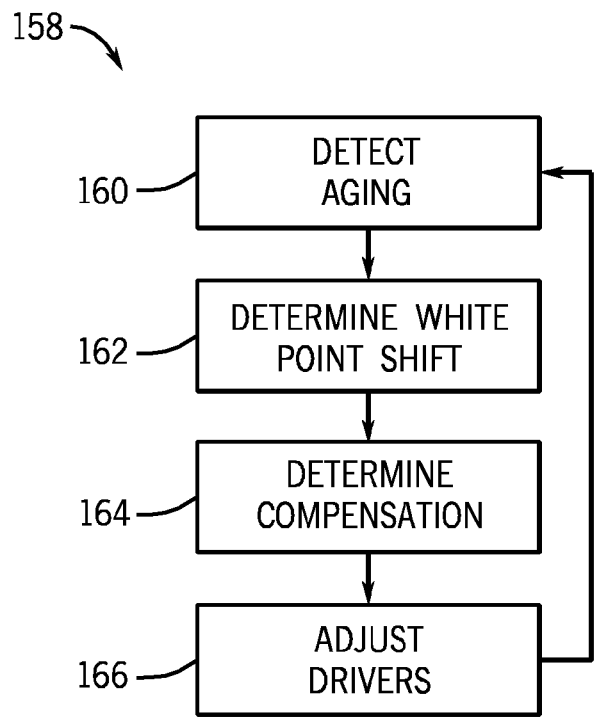
FIG. 20 is a flowchart depicting a method for operating an LED backlight to compensate for aging.

FIG. 20 is a flowchart depicting a method 158 for maintaining a target white point as a display ages. Method 158 may begin by detecting (block 160) aging of display 14 (FIG. 2).

For example, a clock within display 14 (FIG. 2), backlight 32 (FIG. 2), or device 10 (FIG. 2) may track operation times of the backlight. When a certain operating time is exceeded, the clock may provide feedback to LED controller 70 indicating that aging has occurred. The clock may track operating time for backlight 32, operating time for individual components within the backlight, such as LEDs 48, or operating time for display 14, among others. In other embodiments, the clock may continuously provide operating times to LED controller 70, and LED controller 70 may determine when a threshold operating time has been exceeded.

Aging also may be detected by sensors included within the backlight 32. For example, sensors 76, shown in FIG. 15, may provide feedback to LED controller 70 that indicates aging. In certain embodiments, sensors 76 may detect the color or brightness of the light emitted by backlight 32. LED controller 70 may then use the feedback from sensors 76 to determine that aging has occurred. For example, LED controller 70 may compare the feedback from sensors 76 to brightness or color thresholds stored within memory 72. In certain embodiments, LED controller 70 may detect that aging has occurred when the feedback from sensors 76 indicate that the emitted white point has shifted by a specified amount from the target white point.

Upon detecting aging, LED controller 70 may determine the shift in the white point due to aging. LED controller 70 may use tables, algorithms, calibration curves, or the like to determine the white point deviation. In certain embodiments, LED controller 70 may use the brightness and/or color values from sensors 76 to determine how much the emitted light has deviated from the target white point. For example, LED controller 70 may compare color values from sensors 76 to target white point values stored within memory 72 to determine the white point shift. In other embodiments, LED LED controller 70 may use the operating time provided by the clock to determine the white point deviation. For example, LED controller 70 may compare the operating time to a calibration curve stored in memory 72 that correlates operating time to white point shifts.

Based on the white point shift, the controller may then determine (block 164) the white point compensation. In certain embodiments, the white point compensation may compensate for a reduction in brightness, as generally illustrated by FIG. 18. For example, if LED controller 70 determines that the brightness has decreased, LED controller 70 may increase the driving strength of each driver to achieve a target brightness level. In certain embodiments, a target brightness level may be stored within memory 72 (FIG. 5) of the backlight 32.

LED controller 70 also may determine individual driving strengths adjustments for the white point compensation. The individual driving strength adjustments may compensate for a shift in the color or chromaticity values of the emitted light, as generally illustrated in FIG. 19. As described above with respect to FIG. 17, LED controller 70 may determine which strings of LEDs should receive driving strength adjustments based on the white point deviation. For example, if the emitted white point is too blue, LED controller 70 may increase the driving strength of a string of yellow tinted LEDs. LED controller 70 may select strings of white LEDs 48 and/or strings of color compensating LEDs 78 to receive driving strength adjustments.

The amount of the driving strength adjustment may depend on the magnitude of the white point deviation. Moreover, in certain embodiments, LED controller 70 may be configured to continuously increase specific driving strengths at a specified rate upon detecting aging. For example, rates of driving strength increases may be stored within memory 72. Further, in certain embodiments, LED controller 70 may ensure that the adjustments fall within limits 120 (FIGS. 16-17) stored within memory 72.

LED controller 70 also may account for the brightness of the backlight when determining the driving strength adjustments. For example, LED controller 70 may adjust the ratio between driving strengths while increasing the overall driving strength of each string to achieve both the target brightness and target white point.

After determining the white point compensation, LED controller 70 may adjust (block 166) the driving strengths to the determined levels. LED controller 70 may then detect (block 160) further aging, and method 158 may begin again. In certain embodiments, LED controller 70 may continuously receive feedback from sensors 76 to detect aging. However, in other embodiments, LED controller 70 may periodically check for aging. Moreover, in other embodiments, LED controller 70 may check for aging when device 10 receives a user input indicating that a check should be performed.

Figure 21:
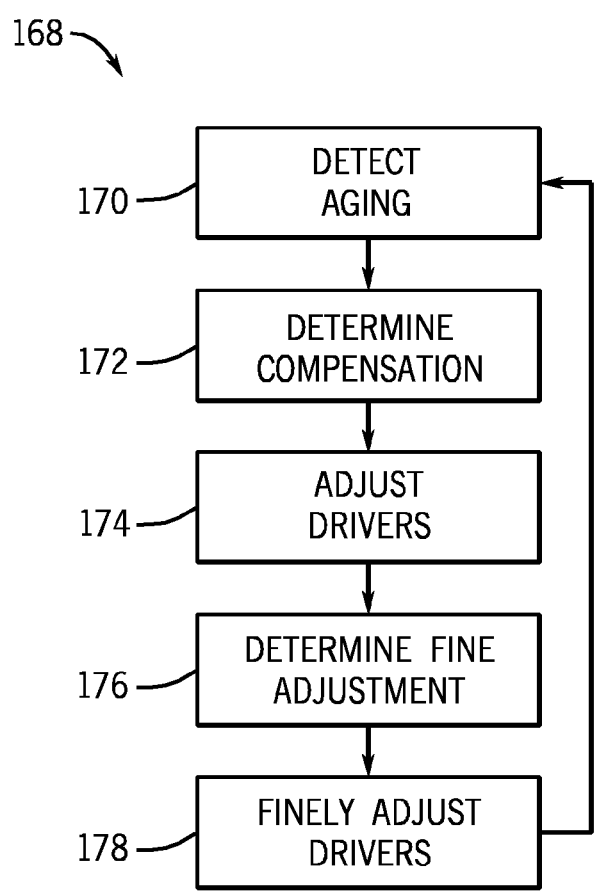
FIG. 21 is a flowchart depicting a method for operating an LED backlight using a calibration curve, in accordance with aspects of the present disclosure.

After aging compensation has occurred, further adjustments may be made to fine tune the emitted white point to the target white point. FIG. 21 is a flowchart depicting a method 168 for fine-tuning the emitted white point. Method 168 may begin by detecting (block 170) aging. For example, as described with respect to FIG. 21, the controller may detect aging based on feedback from a clock or from sensors. LED controller 70 may then determine (block 172) the white point compensation based on the aging. For example, LED controller 70 may use compensation information 118 (FIG. compensation information 118 (FIG. 16), such as a calibration curve, table, algorithm, or the like, that correlates a driving strength or driving strength adjustment to operational hours, color values, brightness values, or the like. Compensation information 118 also may specify the drivers or channels that should receive the driving strength adjustment. After determining the white point compensation, LED controller 70 may adjust (block 174) the drivers to the determined driving strength. The adjustment may restore the light output to an emitted white point that substantially matches the target white point.

The controller may then determine (block 176) a fine adjustment that may allow the emitted white point to more closely match the target white point. For example, device 10 may include a software application for receiving a fine adjustment input from a user. The user may provide the input through the GUI using, for example, one of the user input structures 16 (FIG. 1). In certain embodiments, a user may compare the white point of the display to a calibration curve or chart to determine the fine adjustment input. In other embodiments, LED controller 70 may receive a fine adjustment input from another electronic device connected, for example, through network device 26 (FIG. 2) or through I/O port 18 (FIG. 2). Based on the input, controller 70 may determine a fine adjustment to bring the emitted white point even closer to the target white point.

In another example, LED controller 70 may determine the fine adjustment based on feedback received from one or more sensors included within device 10. For example, sensors 76 may provide feedback to LED controller 70 for fine-tuning the drivers. For example, LED controller 70 receive feedback from sensors 76 (FIG. 16) and determine the fine adjustment in a manner similar to that described with respect to FIG. 17.

After determining (block 176) the fine adjustment, LED controller 70 may adjust (block 178) the drivers. However, in certain embodiments, the fine adjustment may be combined with adjusting (block 174) the drivers to compensate for the white point shift. In these embodiments, the fine adjustment may be determined along with the white point compensation determination. After the drivers have been adjusted, LED controller 70 may again determine (block 170) the time elapsed, and method 168 may begin again.

4. Temperature Compensation

In addition to shifting over time due to aging, the emitted white point of backlight 32 may shift due to temperature. In general, as temperature increases, brightness decreases due to reduced optical retardation. The change in brightness may cause a white point shift. Further, certain sections of backlight 32 may experience different temperatures, which may create color and/or brightness variations throughout backlight 32.

Figure 22:
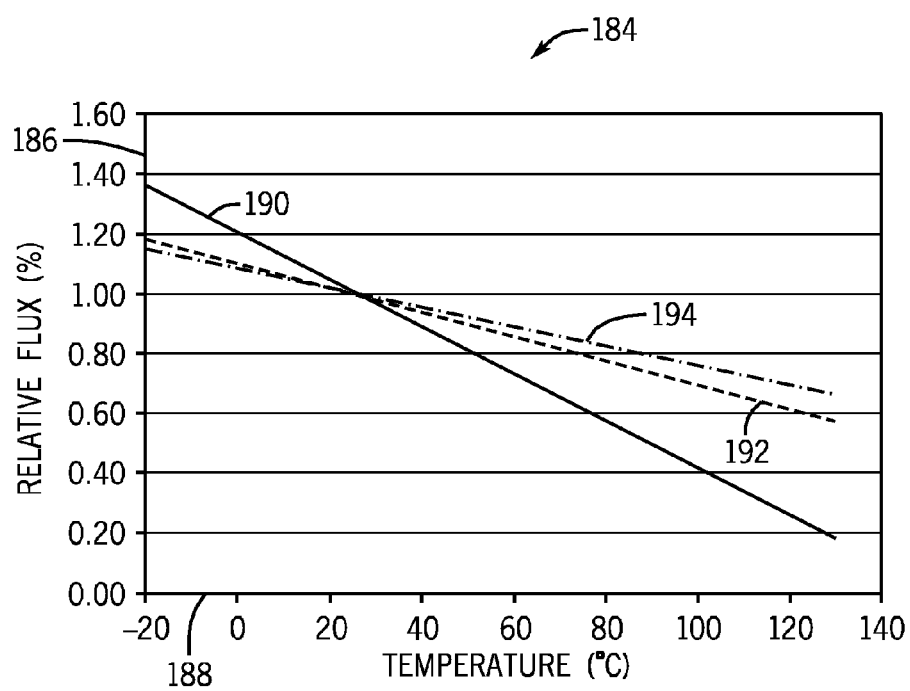
FIG. 22 is a chart depicting the effects of temperature on LED chromaticity, in accordance with aspects of the present disclosure.

FIG. 22 depicts chart 184, which illustrates how the brightness of different colored LEDs may change with temperature. Y-axis 186 indicates the relative flux of the light emitting diodes, and the x-axis 188 indicates the temperature in degrees Celsius. In general, the flux may be the relative percentage of the total amount of light from an LED. Separate lines 190, 192, and 194, each correspond to different color LEDs, normalized to 25 degrees Celsius. Specifically, line 190 represents the change in flux for a red LED, line 192 represents the change in flux for a green LED, and line 194 represents the change in flux for a blue LED. The flux generally decreases as the temperature increases, and the rate of decrease varies between different color LEDs. The differing rates of change may cause a shift in the white point. For example, in backlights employing white LEDs 48 that mix light from individual colored LEDs, the white point may shift because the relative flux of the LEDs within white LEDs 48 may change. The increased temperature also may cause a white point shift for phosphor based LEDs.

Figure 23:
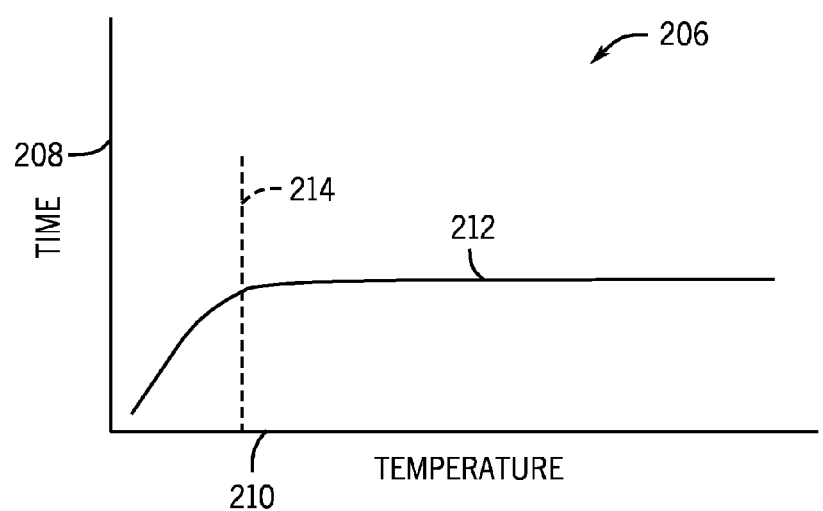
FIG. 23 is a chart depicting the change in temperature of an LCD display, in accordance with aspects of the present disclosure.

FIG. 23 depicts chart 206, which illustrates how the temperature of a backlight may change over time. Y-axis 208 indicates temperature, and x-axis 210 indicates time. Curve 212 generally indicates how temperature 208 may increase and then stabilize after the backlight is turned on. After the backlight is turned on, the temperature may increase until stabilization time 214, generally indicated by the dashed line. After stabilization time 214, the temperature may remain constant. Stabilization time 214 may vary depending on the specific features of backlight 32 (FIG. 2), LDC panel 30 (FIG. 2), and electronic device 10 (FIG. 2). Moreover, in other embodiments, the temperature profile may increase, stabilize, or decrease any number of times at various rates.

Figure 24:
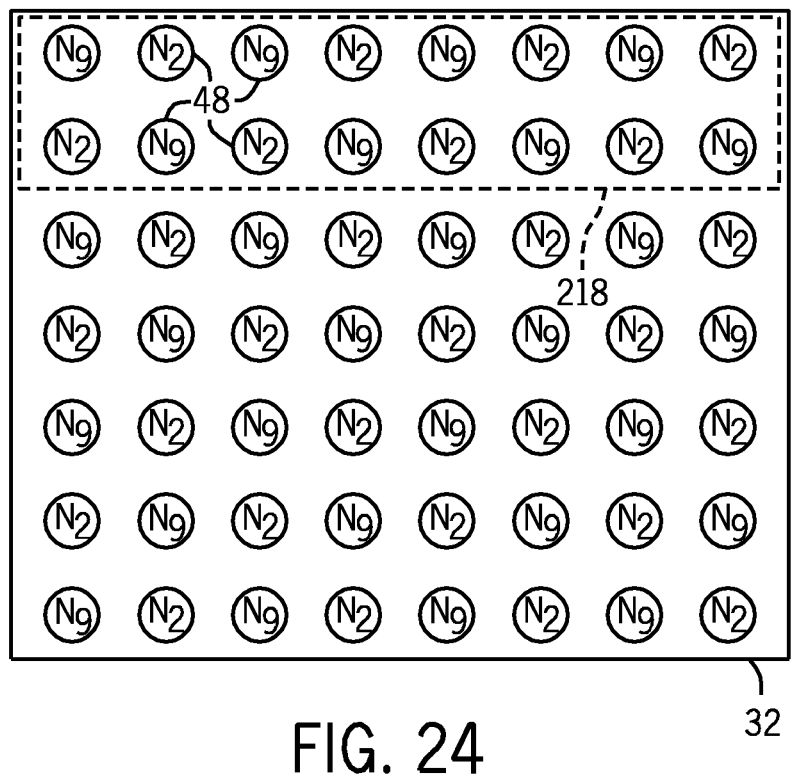
FIG. 24 is a front view of an LED backlight depicting the location of electronics, in accordance with aspects of the present disclosure.

The temperature of backlight 32 also may vary between different sections of the backlight. For example, certain sections of the backlight may experience higher temperatures due to proximity to electronic components that give off heat. As shown in FIG. 24, electronics 218 may be located within one section of backlight 32. Electronics 218 may produce heat creating a localized temperature gradient within backlight 32. In certain embodiments, electronics 218 may include LCD controller 56 and LED drivers 60 as shown in FIG. 3. LEDs 48 located near electronics 218 may experience increased temperatures when compared to other LEDs 48 within the backlight, which may result in variation in the emitted white point and/or brightness across backlight 32. Moreover, the temperature variation may change with time, as illustrated in illustrated in FIG. 23. For example, upon initial operation of the backlight, LEDs 48 within the backlight may be exposed to approximately the same temperature. However, after backlight 32 has been turned on, the temperature of backlight 32 near electronics 32 may increase as shown in FIG. 23, until stabilization period 214. After stabilization period 214, LEDs 48 near electronics 218 may be exposed to a higher temperature than LEDs 48 disposed throughout the rest of backlight 32. In other embodiments, the location of electronics 218 may vary. Further, temperature gradients may be created due to other factors, such as the proximity of other components of electronic device 10, the location of other devices, walls, or features, and the location of a heat sink, among others.

Figure 25:
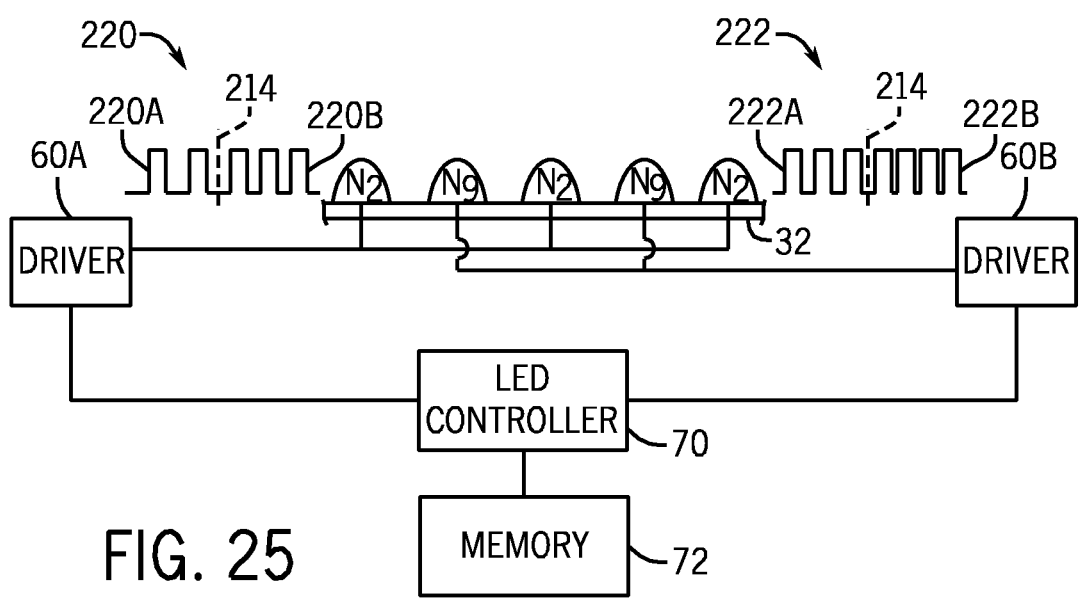
FIG. 25 is a schematic diagram illustrating operation of the LED backlight of FIG. 24, in accordance with aspects of the present disclosure.

FIG. 25 is a schematic diagram illustrating operation of backlight 32 shown in FIG. 24. The LEDs from different bins $N_2$ and $N_9$ may be joined together on strings, each driven by a separate driver 60A and 60B. Each string may be driven at a different driving strength to produce a white point in backlight 32 that substantially matches the target white point. The driving strength of each string also may vary over time to compensate for the white point shift produced by a temperature change within backlight 32. For example, the temperature of backlight 32 may increase upon startup, as shown in FIG. 23. To account for the increase in temperature, the driving strength of each string may vary with time. For example, LED controller 70 may transmit control signals to drivers 60A and 60B to vary duty cycles 220 and 222. Before stabilization period 214, drivers 60A and 60B may have a lower driving strength, indicated by duty cycles 220A and 222A. After stabilization period 214, LED controller 70 may increase the frequency of the duty cycles, as represented by duty cycles 220B and 222B. Further, in other embodiments, LED controller 70 may vary the amount of current provided to LEDs 48, for example using AM, instead of, or in addition to using PWM.

In certain embodiments, the changes in driving strength may be stored within memory 72, and a clock within LED controller 70 may track the operating time. Based on the operating time, LED controller 70 may detect stabilization period 214 and vary the driving strength. LED controller 70 may vary the driving strength to account for temperature changes at various times throughout operation of the backlight. In certain embodiments, the driving strength may be varied based on an operational state of backlight 32. For example, processor 22 may provide information to LED controller 70 indicating the type of media, for example a movie, sports program, or the like, being shown on display 14 (FIG. 2).

Figure 26:
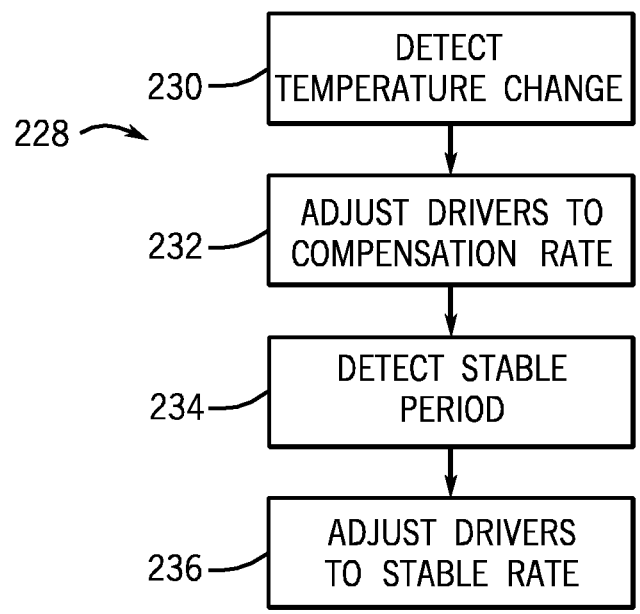
FIG. 26 is a flowchart depicting a method for operating an LED backlight during variations in temperature, in accordance with aspects of the present disclosure.

FIG. 26 is a flowchart a flowchart depicting a method 228 for maintaining a target white point during temperature changes. The method may begin by detecting (block 230) a temperature change. For example, LED controller 70 may detect that a temperature change is occurring based on an operational state of the backlight. For example, LED controller 70 may detect a temperature change upon sensing that backlight 32 has been turned on. In certain embodiments, a clock within electronic device 10 may track operational hours of the backlight. Based on the operational hours, electronic device 10 may detect a temperature change, for example, by using table or calibration curves stored within memory 72.

Upon detecting a temperature change, LED controller 70 may adjust (block 232) the drivers to temperature compensation driving strength. For example, as shown in FIG. 25, LED controller 70 may adjust drivers 60A and 60B to employ duty cycles 220A and 222A. In certain embodiments, the compensation driving strengths may be stored within memory 72 (FIG. 25). During the periods of changing temperature, the drivers may be driven at the same driving strengths, or the driving strength may be adjusted throughout the period of changing temperature. For example, in certain embodiments, after initially detecting a temperature change, such as by sensing startup of the backlight, LED controller 70 may enter a temperature compensation period where the driving strengths are determined by compensation information 118 (FIG. 16) such as calibration curves, tables, or the like. Compensation information 118 may provide varying driving strengths corresponding to specific times within the temperature compensation period. However, in other embodiments, LED controller 70 may adjust the drivers in response to each detected temperature change. Accordingly, LED controller 70 may continuously vary or periodically vary the driving strengths during the temperature compensation period to maintain the target white point.

The LED controller 70 may continue to operate drivers 60 at the compensation driving strengths until LED controller 70 detects (block 234) a temperature stabilization period. For example, a clock within device 10 may indicate that the temperature has stabilized. LED controller 70 may then adjust (block 236) the drivers to a temperature stabilization driving strength. For example, as shown in FIG. 25, LED controller 70 may adjust drivers 60A and 60B to duty cycles 220B and 222B. In certain embodiments, the stabilization driving strengths may be stored within memory 72.

Figure 27:
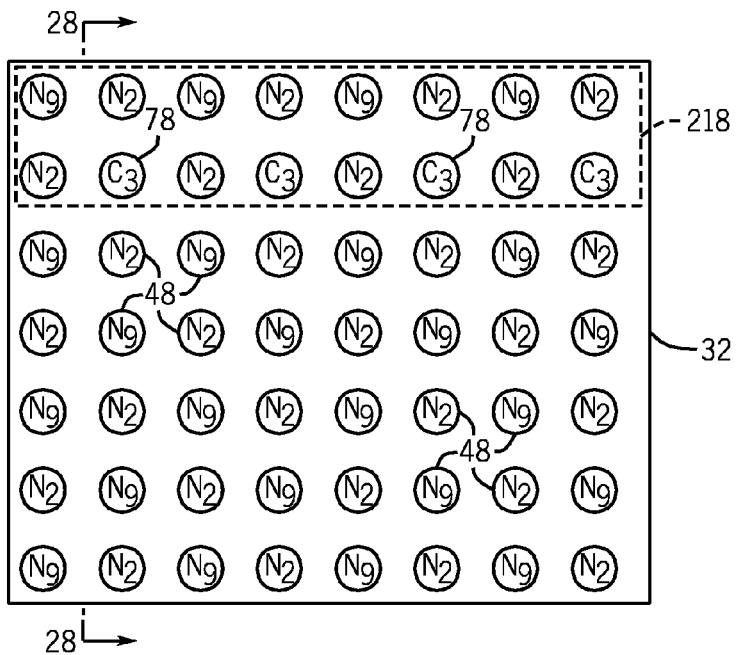
FIG. 27 is a front view of an LED backlight employing color compensating LEDs, in accordance with aspects of the present disclosure.

In certain embodiments, a dedicated string of LEDs may be used to compensate for temperature changes. For example, as shown in FIG. 27, color compensating LEDs 78 from a bin $C_3$ may be placed near electronics 218 of backlight 32. 32. In certain embodiments, bin C3 may be selected based on the white point shift generally exhibited due to temperature changes. For example, in LED backlight 32 that includes yellow phosphor LEDs, the white point may shift towards a blue tint as temperature increases. Therefore, bin $C_3$ may encompass a yellow spectrum to compensate for the blue shift. Color compensating LEDs 78 may be disposed near electronics 218 within backlight 32 to allow compensation for localized white point shifts. However, in other embodiments, color compensating LEDs 78 may be dispersed throughout backlight 32 to allow compensation for temperature changes affecting other regions of backlight 32 or entire backlight 32.

Figure 28:
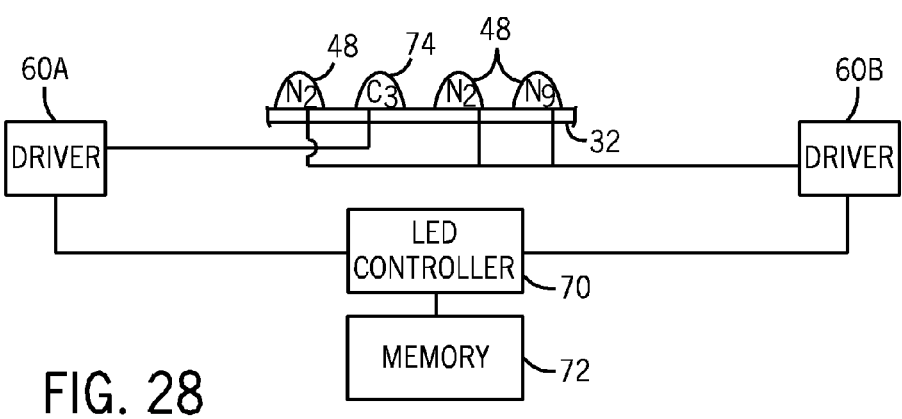
FIG. 28 is a schematic diagram illustrating operation of the LED backlight of FIG. 27.

FIG. 28 schematically illustrates operation of backlight 32 shown in FIG. 27. Color compensating LEDs 78 may be driven by one driver 60A while white LEDs 48 are driven by another driver 60B. The separate drivers 60A and 60B may allow the driving strength of color compensating LEDs 78 to be adjusted independently from the driving strength of white LEDs 48. As temperature changes occur within backlight 32, LED controller 70 may adjust the driving strength of driver 60 to compensate for a white point shift that may occur due to temperature. For example, during increased temperatures, LED controller 70 may drive color compensating LEDs 78 at a higher rate to maintain the target white point. In certain embodiments, LED controller 70 may adjust the driving strength of driver 60A during a temperature compensation period as described with respect to FIG. 26.

Figure 29:
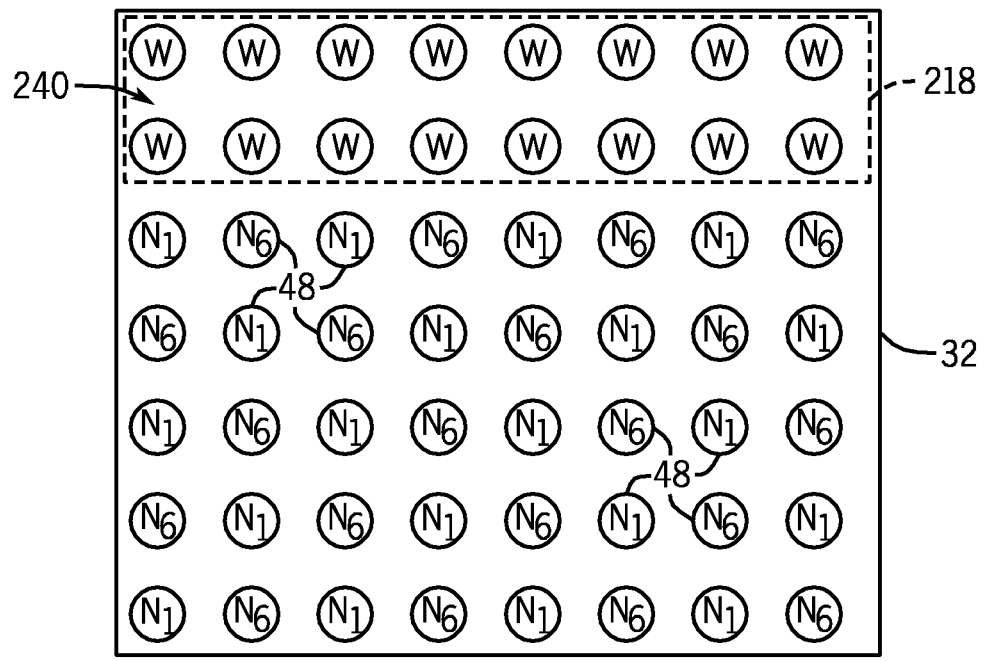
FIG. 29 is a front view of an LED backlight employing different LED strings to compensate for temperature, in accordance with aspects of the present disclosure.

FIG. 29 illustrates another embodiment of backlight 32 that may compensate for temperature changes. Instead of, or in addition to color compensating LEDs 78, dedicated string 240 of white LEDs 48 may be located near electronics 218 to account for temperature variations. As shown, string 240 includes LEDs from bin W. However, in other embodiments, the string may include LEDs from neighboring bins, such as bins $N_{1-12}$.

Figure 30:
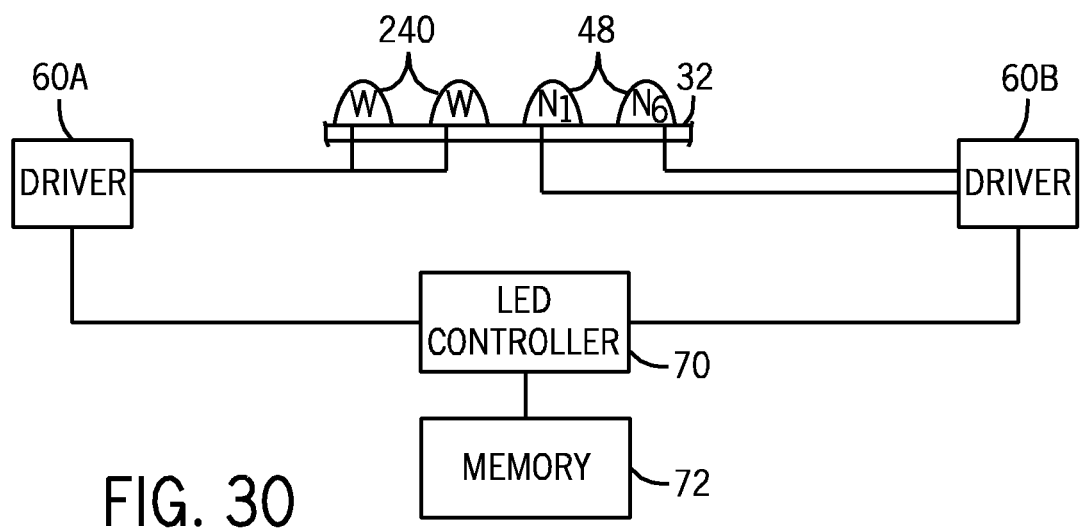
FIG. 30 is a schematic diagram illustrating operation of the LED backlight of FIG. 28, in accordance with aspects of the present disclosure.

As illustrated in FIG. 30, dedicated string 240 may be driven by one driver 60A, while other LEDs 48 are driven by another driver 60B. In certain embodiments, the other driver 60B may include multiple channels for independently driving LEDs from separate bins $N_1$ and $N_6$. The separate channels may allow the relative driving strengths for each bin to be varied to achieve the desired white point as described with respect to FIGS. 5-17.

The LED controller 70 may adjust the driving strength of driver 60A to reduce white point variation throughout backlight 32. For example, the white point emitted near electronics 218 may vary from the white point emitted throughout the rest of the board due to a temperature gradient that may occur near electronics 218. LED controller 70 may adjust the driving strength for dedicated string 240 to maintain the target white point near electronics 218. LED controller 70 also may vary the driving strength of dedicated string 240 during temperature compensation periods as described with respect to FIG. 26.

Figure 31:
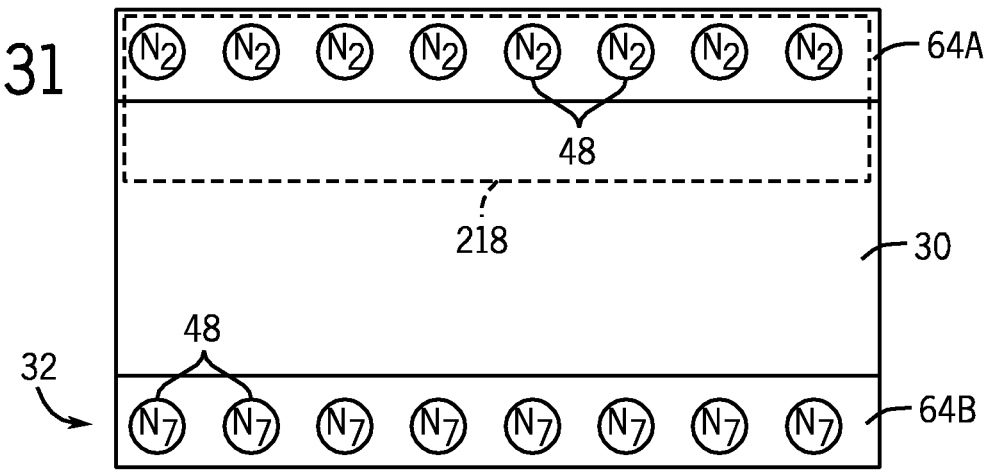
FIG. 31 is a front view an edge-lit LED backlight, in accordance with aspects of the present disclosure.

FIG. 31 illustrates an edge-lit embodiment of backlight 32 that may adjust driving strengths to compensate for temperature changes. Backlight 32 includes two light strips 64A and 64B, with each light strip 64A and 64B employing LEDs from different bins $N_2$ and $N_7$. The driving strength of each light strip 64A and 64B may be adjusted independently to maintain the target white point during temperature changes. Further, the driving strength of upper light strip 64A may be adjusted to account for the increased temperatures that may be generated by electronics 218. In other embodiments, multiple strings of LEDs from various bins may be included within each light strip 64A and 64B. In certain embodiments, the separate strings of LEDs may be adjusted independently to compensate for temperature changes as described with respect to FIG. 26.

Figure 32:
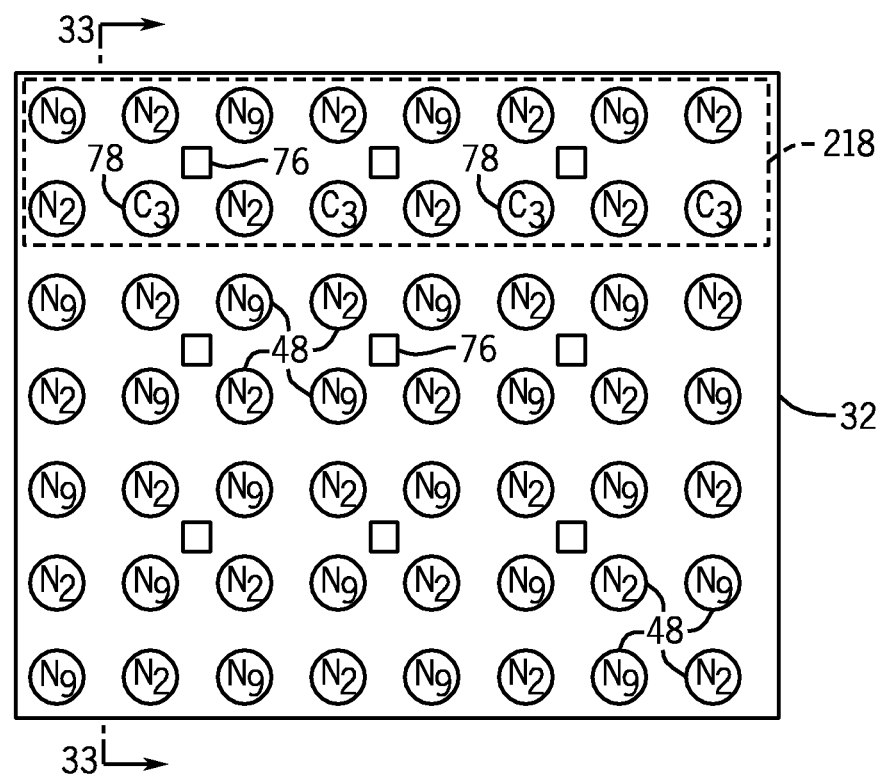
FIG. 32 is a front view of an LED backlight employing sensors, in accordance with aspects of the present disclosure.

FIG. 32 illustrates another embodiment of backlight 32 that includes sensors 76. Any number of sensors 76 may be disposed in various arrangements throughout backlight 32. As described above with respect to FIG. 5, sensors 76 may sense temperatures of backlight 32 and provide feedback to LED controller 70 (FIG. 5). For example, sensors 76 may be used to detect a temperature compensation period as described in FIG. 26. Sensors 76 also may be used to detect local variations in temperature within backlight 32. For example, sensors 76 may provide feedback indicating the extent of the temperature gradient near electronics 218. In other embodiments, sensors 76 may detect a color of the light output by LEDs 48. LED controller 70 may use the feedback to adjust the driving strength to maintain the target white point.

Figure 33:
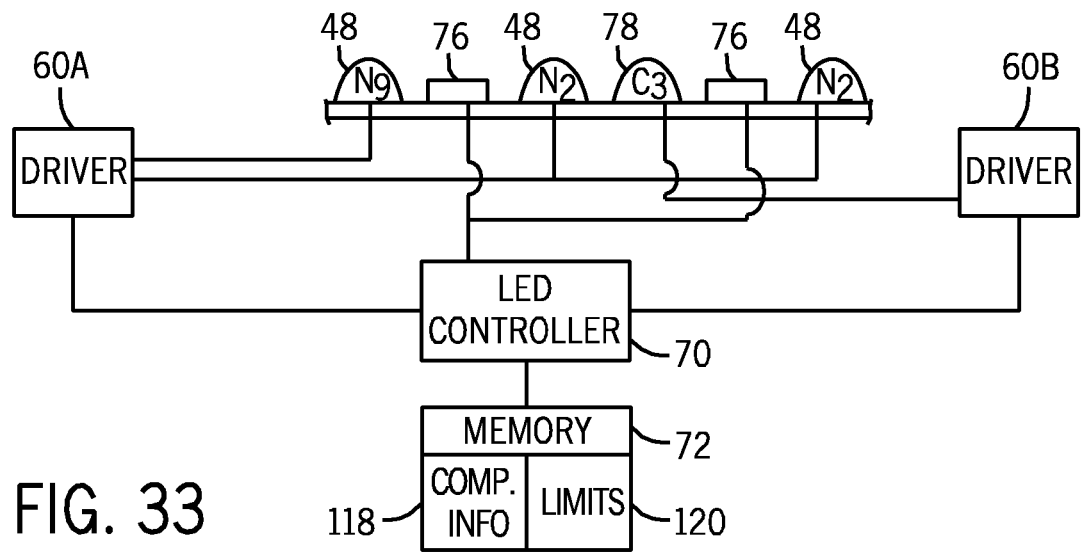
FIG. 33 is a schematic diagram illustrating operation of the LED backlight of FIG. 32, in accordance with aspects of the present disclosure.

FIG. 33 schematically illustrates operation of the backlight of FIG. 32. Sensors 76 may provide feedback to LED controller 70 that LED controller 70 may use to detect temperature compensation periods and/or local temperature variations. LED controller 70 may use the feedback to determine driving strengths for drivers 60A and 60B to achieve the target white point. For example, LED controller 70 may compare the feedback to compensation information 118 stored within memory 72 to determine the driving strengths. If, for example, the sensors indicate a high temperature period, LED controller 70 may decrease the driving strength of color compensating LEDs 78 to maintain the target white point. In another example, LED controller 70 may vary the relative driving strengths of the LEDs from bins $N_9$ and $N_2$ to achieve the target white point during temperature variations.

FIG. 34 is a flowchart illustrating a method 248 for using sensors to maintain a target white point during temperature variations. The method may begin by detecting (block 250) a temperature change based on sensor feedback. For example, as shown in FIG. 33, sensors 76 may detect changes in the white point, for example by sensing temperature and/or chromaticity values, and provide feedback to LED controller 70. Using the feedback, LED controller 70 may determine the temperature profile (block 252) of the backlight 32. For example, LED controller 70 may determine whether the temperature profile includes local variation, for example, near electronics 218. LED controller 70 also may determine whether the temperature has increased across backlight 32 as a whole.

The LED controller 70 may then determine (block 254) the compensation driving strengths. In certain embodiments, LED controller 70 may compare the temperature profile determine in block 252 to compensation information 118 (FIG. 33) to determine which drivers to adjust. For example, as shown in FIGS. 32 and 33, if sensors 76 detect an increase in temperature only near electronics 218, LED controller 70 may adjust the driving strength of driver 60B to drive the color compensating LEDs from bin $C_3$ at an increased strength. However, if sensors 76 detect a temperature increase throughout backlight 32, for example due to an increase in ambient temperature, LED controller 70 may increase the driving strengths of both drivers 60A and 60B. In certain embodiments, the driving strengths may be adjusted to compensate for both a localized temperature profile and an overall temperature change. After determining (block 254) the compensation driving strengths, LED controller 70 may may adjust (block 256) the drivers to the compensation driving strengths.

Sensors 76 also may be used maintain the target white point during shifts due to both aging and temperature. For example, if both the sensors 76 detect a color and/or brightness of the light, sensors 76 may provide feedback for adjusting the white point, regardless of whether the shift is due to temperature, aging, or any other factor. In another example, sensors 76 may include optical sensors to detect shifts due to aging and temperature sensors to detect shifts due to temperature. Further, in other embodiments, sensors 76 may include temperature sensors to detect white point shifts due to temperature changes, and compensation information 118 (FIG. 20), such as calibration curves, may be employed to compensate for white point shifts due to aging.

FIG. 35 is a flowchart illustrating a method for compensating for white point shifts due to aging and temperature variations. Method 258 may begin by receiving (block 260) sensor feedback. For example, LED controller 70 may receive feedback from sensors 76, shown in FIG. 33. Based on the feedback, LED controller 70 may determine (block 262) white point variation. For example, sensors 76 may indicate localized temperature variation near electronics 218 (FIG. 32). In another example, sensors 76 may indicate local white point variations due to an aging LED string. LED controller 70 may then determine (block 264) local white point compensation. For example, LED controller 70 may adjust the driving strength of an individual string of LEDs, to reduce variation in the white point throughout backlight 32.

After determining compensation driving strengths to reduce variation throughout backlight 32, LED controller 70 may then determine (block 266) the deviation from the target white point. For example, LED controller 70 may use feedback from feedback from sensors 76 to detect a shift in the white point due to aging of backlight 32 or due to a change in ambient temperature. The controller may determine (block 268) the white point compensation driving strengths for achieving the target white point. For example, if the emitted white point has a blue tint when compared to that target white point, LED controller 70 may increase the driving strength of yellow tinted LEDs. LED controller 70 may adjust the driving strengths as described above with respect to FIGS. 11-17. After determining the driving strengths, LED controller 70 may adjust (block 270) the drivers to determine driving strengths.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display, comprising:
   a plurality of white light emitting diodes arranged within an electronics region and other regions of a backlight to produce an emitted white point that corresponds to a target white point, wherein the electronics region is configured to produce more heat during operation of the display than the other regions;
   a plurality of color compensating light emitting diodes arranged only within the electronics region of the backlight and intermixed with the plurality of white light emitting diodes;
   one or more drivers configured to drive groups of one or more color compensating light emitting diodes of the plurality of color compensating light emitting diodes at a respective driving strength; and
   a controller configured to detect a temperature change within the electronics region and to adjust at least one of the respective driving strengths to compensate for a shift in the emitted white point of white light emitting diodes arranged within the electronics region due to the temperature change.

2. The display of claim 1, wherein the plurality of white light emitting diodes are selected from neighboring bins surrounding a bin encompassing the target white point.

3. The display of claim 1, wherein the controller is configured to detect the temperature change within the electronics region based on an operational state of the backlight.

4. The display of claim 1, comprising a memory configured to store a calibration curve defining driving strength adjustments based on the detected temperature change within the electronics region.

5. The display of claim 1, comprising one or more sensors disposed in the backlight and configured to detect the temperature change within the electronics region.

6. The display of claim 5, wherein the sensors comprise optical sensors configured to sense a color of the emitted white point, and wherein the controller is configured to detect the temperature change within the electronics region based on the sensed color.

7. The display of claim 1, wherein the color compensating light emitting diodes comprise color light emitting diodes.

8. The display of claim 1, wherein the one or more drivers are configured to drive groups of one or more white light emitting diodes of the plurality of white light emitting diodes at a specified driving strength, and wherein the controller is configured to maintain the specified driving strength at a constant rate.

9. A display, comprising:
   a plurality of white light emitting diode strings each arranged within an electronics region and other regions of a backlight to produce an emitted white point that substantially matches a target white point, wherein the electronics region is configured to produce more heat during operation of the display than the other regions;
   a dedicated light emitting diode string disposed only in the electronics region of the backlight, wherein the dedicated light emitting diode string comprises one or more color compensating light emitting diodes, wherein only the electronics region comprises color compensating light emitting diodes;
   a driver configured to independently drive the plurality of white light emitting diode strings of the electronics region and the other regions at specified driving strengths and to drive the dedicated light emitting diode string at a dedicated driving strength; and a controller configured to detect a temperature change within the electronics region and to adjust the dedicated driving strength to compensate for a shift in the emitted white point of white light emitting diode strings arranged in the electronics region due to the temperature change.

10. The display of claim 9, wherein the electronics region is adjacent to circuit boards.

11. The display of claim 9, wherein the plurality of white light emitting diode strings are configured to emit a first range of chromaticity values, and the dedicated light emitting diode string is configured to emit a second range of chromaticity values outside of the first range.

12. The display of claim 9, wherein the plurality of white light emitting diode strings comprises a first string disposed in the electronics region and a second string disposed in the other regions.

13. The display of claim 9, wherein the plurality of white light emitting diode strings are disposed in a light strip and the dedicated light emitting diode string is disposed in another light strip.

14. The display of claim 9, comprising one or more sensors configured to measure temperatures within the backlight, and wherein the controller is configured to detect the temperature change based on the measured temperatures.

15. The display of claim 14, wherein the one or more sensors are configured to detect a temperature gradient within the backlight, and wherein the controller is configured to adjust the specified driving strengths and the dedicated driving strength to compensate for the temperature gradient.

16. A method of operating a backlight of a display, the method comprising:

independently driving each of a plurality of white light emitting diode strings at a respective white point driving strength to produce an emitted white point that substantially matches a target white point, wherein each of the plurality of white light emitting diode strings is arranged within an electronics region and other regions of the backlight, and the electronics region produces more heat during operation of the display than the other regions;

driving one or more color compensating light emitting diode strings disposed only in the electronics region at a respective color compensating driving strength, wherein only the electronics region comprises color compensating light emitting diode strings;

detecting a temperature change within the electronics region of the backlight;

determining a shift in the emitted white point of each of the white light emitting diode strings arranged within the electronics region based on the detected temperature change; and adjusting at least one of the respective color compensating driving strengths to compensate for the shift.

17. The method of claim 16, wherein detecting a temperature change within the electronics region of the backlight comprises sensing a color of light output by the white light emitting diode strings arranged within the electronics region and correlating the sensed color to the temperature change.

18. The method of claim 16, wherein detecting a temperature change within the electronics region of the backlight comprises receiving a temperature of the backlight from a temperature sensor disposed within the electronics region of the backlight.

19. The method of claim 16, wherein detecting a temperature change comprises detecting an operating period of the backlight, and wherein adjusting at least one of the respective color compensating driving strengths comprises adjusting the respective color compensating driving strength at a rate determined by a calibration curve for the detected operating period.

20. The method of claim 16, wherein adjusting at least one of the respective color compensating driving strengths comprises varying the respective color compensating driving strength at a constant rate until a temperature stabilization period is detected.

21. The method of claim 16, wherein adjusting at least one of the respective color compensating driving strengths comprises:

determining a temperature gradient within the backlight through feedback received from one or more temperature sensors; and adjusting the respective color compensating driving strengths to balance the white point across the temperature gradient.

22. The method of claim 16, comprising determining a temperature profile within the backlight based on the detected temperature change within the electronics region of the backlight.

23. The method of claim 16, wherein the color compensating light emitting diodes comprise yellow light emitting diodes, red light emitting diodes, or blue light emitting diodes, or a combination thereof.

* * * * *